(12) United States Patent
Eagan et al.

(10) Patent No.: US 11,043,222 B1
(45) Date of Patent: Jun. 22, 2021

(54) AUDIO ENCRYPTION

(71) Applicant: Amazon Technologies, Inc., Seattle, WA (US)

(72) Inventors: Benjamin Charles Eagan, Toronto (CA); Maciej Makowski, Aurora (CA); Zack Shahaf Matorin, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/208,474

(22) Filed: Dec. 3, 2018

(51) Int. Cl.
| | | |
|---|---|---|
| *G10L 19/018* | (2013.01) | |
| *G10L 15/26* | (2006.01) | |
| *H04L 29/06* | (2006.01) | |
| *G10L 15/22* | (2006.01) | |

(52) U.S. Cl.
CPC .............. *G10L 15/26* (2013.01); *G10L 15/22* (2013.01); *G10L 19/018* (2013.01); *H04L 63/0428* (2013.01); *G10L 2015/223* (2013.01)

(58) Field of Classification Search
CPC ... G10L 15/26; G10L 15/22; G10L 2015/223; G10L 19/018; G10L 2015/224; G10L 18/018; H04L 63/0428
See application file for complete search history.

(56) References Cited

U.S. PATENT DOCUMENTS

| | | | | |
|---|---|---|---|---|
| 2007/0266258 | A1* | 11/2007 | Brown | H04L 9/0822 |
| | | | | 713/183 |
| 2008/0232175 | A1* | 9/2008 | Aoki | G11C 7/1006 |
| | | | | 365/189.14 |
| 2016/0260431 | A1* | 9/2016 | Newendorp | G06F 3/167 |
| 2019/0251975 | A1* | 8/2019 | Choi | H04L 63/083 |

* cited by examiner

*Primary Examiner* — Abul K Azad
(74) *Attorney, Agent, or Firm* — Lee & Hayes, P.C.

(57) ABSTRACT

A speech interface device is configured to defer encryption of audio data on-device until a time when the encryption operation is not competing with other computationally-intensive operations for responding to the audio data. For example, audio data based on sound captured in an environment of the speech interface device can be stored in volatile memory of the speech interface device, without encrypting it, until a set of processing operations (e.g., ASR processing, NLU processing, audio event processing, etc.) performed based on the audio data have stopped. Based on a determination that these processing operations for responding to the audio data have stopped, the logic may encrypt the audio data to generate encrypted data, and the encrypted data can be stored in non-volatile memory of the speech interface device for uploading to a remote system when a connection is available.

20 Claims, 7 Drawing Sheets

AUDIO ENCRYPTION

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
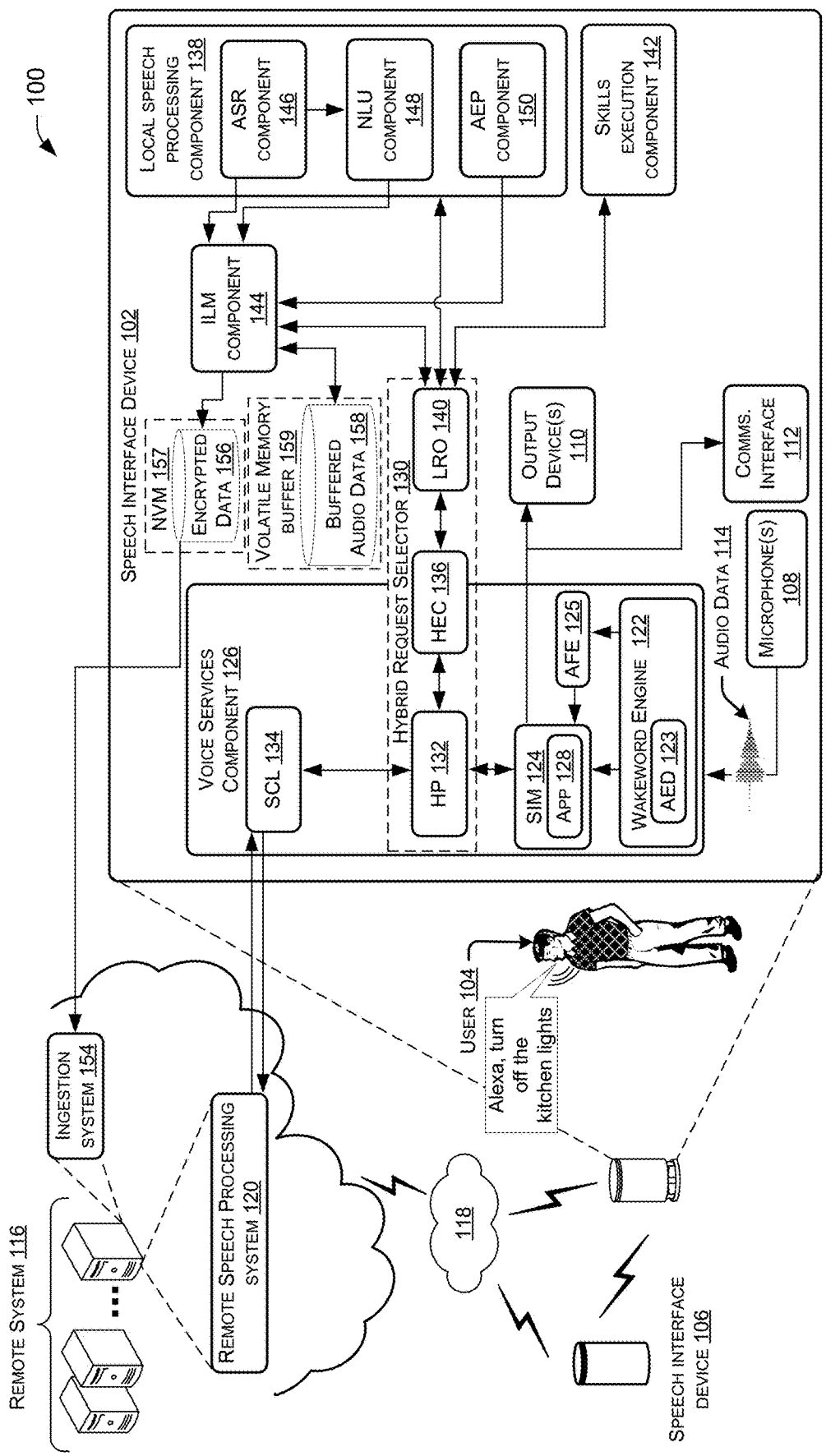
FIG. 1 is a block diagram illustrating a system including a speech interface device that is capable of deferring encryption of audio data until a time when the encryption operation is not competing with other computationally-intensive operations for responding to the audio data.

Described herein are, among other things, techniques, devices, and systems, including a speech interface device that is configured to defer encryption of audio data on-device until a time when the encryption operation is not competing with other computationally-intensive operations for responding to the audio data. For example, audio data that is generated based on sound captured in an environment of the speech interface device can be stored in volatile memory of the speech interface device until a set of local processing operations stop, and, thereafter, the audio data can be encrypted and stored in non-volatile memory of the speech interface device. In other words, the encryption of the audio data is delayed until a time when local resources of the speech interface device are not being heavily utilized by components involved in generating time-sensitive response data.

In an illustrative example, a speech interface device may reside within an environment (e.g., in a home, automobile, office, hotel, etc.), perhaps along with one or more additional devices (including, for example, other speech interface devices, one or more second devices, such as home automation devices, mobile phone, tablet, TV, wireless speaker, etc.). The speech interface device is configured with "hybrid" functionality, which allows the speech interface device to process user speech locally as well as sending the same audio data (or some derivative thereof) to a remote system for processing. The speech interface device can also be configured to decide on its own and/or be instructed (by the remote system) whether to respond to user speech using response data from a remote speech processing system, or response data from a local speech processing component. The hybrid functionality may also allow the speech interface device to process audio data (among other types of data) locally, and to determine whether conditions are met for triggering the execution of a rule(s). This hybrid functionality, allows the speech interface device to respond to user speech and/or to execute rules, even in instances when a remote system—which, when available, can be used for processing user speech remotely and/or for executing rules—is, for example, unavailable to, slower than (with network-related latency factored in), or otherwise less preferred than the speech interface device.

As mentioned, the audio data that is to be encrypted on-device may represent user speech, such as when a user is interacting with the speech interface device using his/her voice. However, in some embodiments, the audio data that is to be encrypted on-device may represent a noise or another non-speech sound (e.g., the sound of a hand clap, the sound of glass breaking, etc.), and this audio data can be processed to determine if the noise or the sound in the environment corresponds to an audio event. In any case, before the audio data is encrypted on-device, the audio data can be stored in volatile memory until a later point in time when local resource consumption is low relative to the level of resource consumption during local speech processing and/or local rule execution. Meanwhile, the audio data can also be input to a local speech processing component executing on the speech interface device. After computationally-intensive processing operations (e.g., automatic speech recognition (ASR) processing, natural language understanding (NLU) processing, audio event processing, etc.) have ceased, the audio data can then be encrypted in order to generate encrypted data, and the encrypted data can be stored in non-volatile memory of the speech interface device for uploading to a remote system subsequently (e.g., such as when a suitable connection is available and the local device has relatively more available resources). By deferring audio data encryption in this manner, the encryption operation is not competing with nor adding latency to other computationally-intensive local processing operations (e.g., ASR processing, the NLU processing, audio event processing, etc.) that are performed for purposes of responding to user speech and/or non-speech noise or sound(s) that correspond to an audio event detected in the audio data.

In some embodiments, an interaction log manager (ILM) component executing on the speech interface device is configured to implement the deferment of audio data encryption based on events that the ILM receives from a local request orchestrator (LRO) executing on the speech interface device. These events (event data) may inform the ILM component as to times when local processing resources are about to experience high resource consumption and times when this high resource consumption has stopped. In some embodiments, if the encryption of audio data has started, but has not finished, the encryption may be paused in the middle of encrypting the audio data. This may occur when the ILM receives an event indicating that a new user interaction has started and/or new audio event has been detected in the audio data. After pausing encryption, the encryption can be resumed after local operations performed for responding to the audio data have stopped.

Because the encryption of audio data on-device utilizes a significant amount of computing resources on the speech interface device, deferring audio data encryption, as described herein, "frees up" the local computing resources for use by to other local components of the speech interface device. These other computationally-intensive operations—such as ASR processing, NLU processing, audio event processing, etc.—are thereby able to utilize local computing resources (e.g., processing resources) without causing congestion on the device. Thus, the deferment of audio data encryption, as described herein, mitigates any negative performance impact the encryption would otherwise have on the local components of the speech interface device that are tasked with generating time-sensitive response data.

The techniques and systems described herein may provide various technical benefits. For instance, deferring encryption of audio data, as described herein, can be used to defer encryption, either partially or entirely, until after a set of processing operations for performing the primary function(s) of the speech interface device have ceased. This results in generating response data with reduced latency, which translates into an improved user experience and/or reduced cost of components otherwise needed for implementing speech processing by a user device. Lastly, in cases where temporarily stored audio data is discarded instead of being encrypted (as described in more detail below), the techniques and systems described herein conserve local computing resources by avoiding the unnecessary encryption of audio data and the unnecessary storage of such data.

FIG. 1 is a block diagram illustrating a system 100 including a speech interface device 102 that is capable of deferring encryption of audio data, either partially or entirely, until a time when the encryption operation is not going to be competing with other computationally-intensive operations that are performed for responding to the audio data. "Competing," as used herein (e.g., in the context of this paragraph), may mean the parallel execution of multiple computer programs called "processes" that are individually made up of multiple threads of execution. "Competing," as used herein (e.g., in the context of this paragraph) may additionally, or alternatively, mean the parallel execution of multiple threads of execution such that individual threads utilize computing resources at different times. For instance, a first thread and a second thread may compete for these resources by interleaving their usage of these resources.

"Competing," as used herein (e.g., in the context of this paragraph) may additionally, or alternatively, mean causing the total resource (e.g., processor resource and/or memory resource) utilization on the speech interface device 102 to exceed a predetermined threshold. For example, if, by performing the encryption of audio data, the total processor and/or memory utilization on the speech interface device 102 would exceed a predetermined threshold percentage, which is likely to add latency to other processes (namely those processing operations that are currently running and that consume or utilize, on average, a particular percentage of the total processing and/or memory resources), the encryption of the audio data can be considered to be "competing" with these other processing operations. If, on the other hand, by performing the encryption of audio data, the total processor utilization on the speech interface device 102 would not exceed a predetermined threshold, there may be enough available local resources for the encryption operations and other processing operations to perform their respective tasks without adding latency to the other processing operations. In this latter case, the encryption of the audio data would not be considered to be competing with these other processing operations. A "computationally-intensive processing operation," as used herein, means a processing operation that consumes or utilizes, on average, a percentage of the total processing and/or memory resources of the speech interface device 102 that is above a predetermined threshold percentage and/or that takes a particular amount of time to complete. The "deferment" of audio data encryption, among other technical benefits, frees up local computing resources (e.g., processing resources, etc.) for use by other components of the speech interface device 102 that perform time-sensitive operations, such as operations performed for responding to user speech represented by the audio data. Freeing up local resources causes a reduction in latency, which improves the user experience with the speech interface device 102.

The speech interface device 102 may be located within an environment to provide various capabilities to a user 104, when the user 104 is also in the environment. The environment in which the speech interface device 102 is located may be a home or other premises, an automobile, or any similar environment. Such an environment may include other devices including additional speech interface devices, such as the speech interface device 106, and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 108, and responding in various ways, such as by outputting content via an output device(s) 110, which may be a speaker(s), a display(s), or any other suitable output device 110. In addition, the speech interface device 102 may be configured to respond to user speech by controlling second devices that are collocated in the environment with the speech interface device 102, such as by sending a command to a second device via a communications interface 112 (e.g., a short range radio), the command instructing an operation to be performed at the second device (e.g., to turn on a light in the environment). FIG. 1 also shows that, in addition to using the microphone(s) 108 to capture utterances and convert them into digital audio data 114, the speech interface device 102 may additionally, or alternatively, receive audio data 114 (e.g., via the communications interface 112) from another speech interface device 106 in the environment, such as when the other speech interface device 106 captures an utterance from the user 104 and sends the audio data 114 to the speech interface device 102. This may occur in situations where the other speech interface device 106 is closer to the user 104 and would like to leverage the "hybrid" capabilities of the speech interface device 102.

Under normal conditions, the speech interface device 102 may operate in conjunction with and/or under the control of a remote, network-based or network-accessible control system 116 (abbreviated to "remote system" 116 in FIG. 1). The remote system 116 may, in some instances be part of a network-accessible computing platform that is maintained and accessible via a wide area network 118. Network-accessible computing platforms such as this may be referred to using terms such as "on-demand computing", "software as a service (SaaS)", "platform computing", "network-accessible platform", "cloud services", "data centers", and so forth. The remote system 116 may be configured to provide particular functionality to large numbers of local (e.g., in-home, in-car, etc.) devices of different users. The wide area network 118 is representative of any type of public or private, wide-area network, such as the Internet, which extends beyond the environment of the speech interface device 102. Thus, the wide area network 118 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The term "local" is used herein as an adjective that describes a common attribute of devices, components, processing operations, and resources (e.g., computing resources, such as processing resources, memory resources, networking resources, etc.). As used herein, a "local" device, component, processing operation, and/or resource can be one that is located, or performed, in the environment of the speech interface device 102. By contrast, a device, component, processing operation, and/or resource that is located, or performed, at a geographically remote location, such as the geographically remote location of the remote system 116, is not considered to be a "local" device, component, processing operation, and/or resource. Thus, a "local" component may be a physical, logical and/or functional component of the speech interface device 102 itself, or a physical, logical and/or functional component that is located in the environment of the speech interface device 102 and is in communication (e.g., in short-range wired or wireless communication) with the speech interface device 102. A contrasting example is a component of a server that is located at a geographically remote location and is part of the remote system 116; such a component is not considered a "local" component, as the term "local" is used herein. A "local" device can be a device that is located in the environment of the speech interface device 102. For instance, the second speech interface device 106 shown in FIG. 1 is an example of a local device. Similarly, a pair of electronic ear buds that are worn by the user 104 in the vicinity of (e.g., less than a threshold distance from) the speech interface device 102, or a mobile phone carried by the user 104 in the vicinity of the speech interface device 102, are each considered to be an example of a "local" device. When processing operations are described herein as being performed "locally," this means that they are performed at least in part by the speech interface device 102 and/or a component thereof. However, this does not preclude the possibility that another local component and/or device that is located in the environment of the speech interface device 102 may perform some of those "locally-performed" processing operations using its own resources, and/or using the resources of the speech interface device 102. In some embodiments, "local" processing operations are operations performed exclusively by the speech interface device 102. In some embodiments, a "local" device means exclusively the speech interface device 102 and does not include devices that are external or peripheral to the speech interface device 102. That is, local processing may comprise processing that is done within a common environment but across multiple collocated devices, while in other instances local processing may be done within a single device.

In some embodiments, the remote system 116 may be configured to receive audio data 114 from the speech interface device 102, to recognize speech in the received audio data 114 using a remote speech processing system 120, and to perform functions in response to the recognized speech. In some embodiments, these functions involve sending directives, from the remote system 116, to the speech interface device 102 to cause the speech interface device 102 to perform an action, such as output an audible response to the user speech via a speaker(s) (i.e., an output device(s) 110), and/or control second devices in the environment by sending a control command via the communications interface 112. Thus, under normal conditions, when the speech interface device 102 is able to communicate with the remote system 116 over a wide area network 118 (e.g., the Internet), some or all of the functions capable of being performed by the remote system 116 may be performed by sending a directive(s) over the wide area network 118 to the speech interface device 102, which, in turn, may process the directive(s) for performing an action(s). For example, the remote system 116, via a remote directive that is included in remote response data, may instruct the speech interface device 102 to output an audible response (e.g., using text-to-speech (TTS)) to a user's question, to output content (e.g., music) via a speaker of the speech interface device 102, and/or to turn on/off a light in the environment. It is to be appreciated that the remote system 116 may be configured to provide other functions, in addition to those discussed herein, such as, without limitation, providing step-by-step directions for navigating from an origin to a destination location, conducting an electronic commerce transaction on behalf of the user 104 as part of a shopping function, establishing a communication session between the user 104 and another user, and so on.

In some embodiments, the remote system 116 (via the remote speech processing system 120) may be configured to detect an "audio" event(s) in the received audio data 114, and to generate directive data based on the detected "audio" event(s). For example, background non-speech noise or sounds (non-silence) can be captured by a microphone 108 of a speech interface device (e.g., the speech interface device 102, the speech interface device 106, etc.), and audio data 114 representing this non-speech noise or sound(s) in the environment may be analyzed to determine how to respond to a detected audio event. An example of an audio event might be the sound of a hand clap, the sound of breaking glass, the sound of a baby crying, or the like, that is detected in the audio data 114. These and other types of audio events may cause the remote system 116 to instruct the speech interface device 102 to perform various actions, such as turning on/off a light, sounding an alarm (e.g., an alarm of a home or automobile security system).

Returning with reference to the home automation example shown in FIG. 1, the user 104 may utter an expression, such as "Alexa, turn off the kitchen lights." Whether this utterance is captured by the microphone(s) 108 of the speech interface device 102 or captured by another speech interface device 106 in the environment, the audio data 114 representing this user's speech is ultimately received by a wakeword engine 122 of a voice services component 126 executing on the speech interface device 102. The wakeword engine 122 may be configured to compare the audio data 114 to stored models used to detect a wakeword (e.g., "Alexa") that indicates to the speech interface device 102 that the audio data 114 is to be processed for determining an intent (a local NLU result). Thus, the wakeword engine 122 is configured to determine whether a wakeword is detected in the audio data 114, and, if a wakeword is detected, the wakeword engine 122 can proceed with routing the audio data 114 to an audio front end (AFE) 125 of the voice services component 126. If a wakeword is not detected in the audio data 114, the wakeword engine 122 can refrain from sending the audio data 114 to the AFE 125, thereby preventing the audio data 114 from being further processed. The audio data 114 can be discarded in this situation.

In some embodiments, the wakeword engine 122 may include an acoustic event detector (AED) 123. The AED 123 may be configured to compare the audio data 114 to stored models used to detect an acoustic or audio event that indicates to the speech interface device 102 that the audio data 114 is to be processed for determining an intent for the detected audio event. As mentioned above, an example of an audio event might be the sound of a hand clap, the sound of breaking glass, the sound of a baby crying, or the like, that is detected in the audio data 114. In other words, the AED 123 is configured to detect non-speech events in the audio data 114.

The AFE 125 (sometimes referred to as acoustic front end (AFE) 125) of a voice services component 126 executing on the speech interface device 102. The AFE 125 is configured to transform the audio data 114 from the wakeword engine 122 into data for processing by the ASR component 146 and/or the NLU component 148. The AFE 125 may reduce noise in the audio data 114 and divide the digitized audio data 114 into frames representing a time intervals for which the AFE 125 determines a number of values, called features, representing the qualities of the audio data 114, along with a set of those values, called a feature vector, representing the features/qualities of the audio data 114 within the frame. Many different features may be determined, and each feature represents some quality of the audio data 114 that may be useful for ASR processing and/or NLU processing. A number of approaches may be used by the AFE 125 to process the audio data 114, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 125 is configured to use beamforming data to process the received audio data 114. Beamforming can be used to distinguish between the directions from which speech and noise originate. Accordingly, the microphones 108 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 114, used by the AFE 125 in beamforming, may be determined based on results of the wakeword engine's 122 processing of the audio data 114. For example, the wakeword engine 122 may detect the wakeword in the audio data 114 from a first microphone 108 at time, t, while detecting the wakeword in the audio data 114 from a second microphone 108 a millisecond later in time (e.g., time, t+1 millisecond), and so on and so forth, for any suitable number of audio signals corresponding to multiple microphones 108 in a microphone array.

A speech interaction manager (SIM) 124 of the voice services component 126 may receive the audio data 114 that has been processed by the AFE 125. The SIM 124 may manage received audio data 114 by processing utterances and non-speech noise or sounds as events, and the SIM 124 may also manage the processing of directives that are used to respond to the user speech or non-speech noise or sounds (e.g., by controlling the action(s) of the speech interface device 102). The SIM 124 may include one or more client applications 128 for performing various functions at the speech interface device 102.

A hybrid request selector 130 (or, hybrid request selector component 130) of the speech interface device 102 is shown as including a hybrid proxy (HP) 132 (or, hybrid proxy (HP) subcomponent 132), among other subcomponents. The HP 132 can be implemented as a layer within the voice services component 126 that is located between the SIM 124 and a speech communication library (SCL) 134, and may be configured to proxy traffic to/from the remote system 116. For example, the HP 132 may be configured to pass messages between the SIM 124 and the SCL 134 (such as by passing events and directives there between), and to send messages to/from a hybrid execution controller (HEC) 136 (or, hybrid execution controller (HEC) subcomponent 136) of the hybrid request selector 130. For instance, directive data received from the remote system 116 can be sent to the HEC 136 using the HP 132, which sits in the path between the SCL 134 and the SIM 124. The HP 132 may also be configured to allow audio data 114 received from the SIM 124 to pass through to the remote system 116 (e.g., to the remote speech processing system 120) (via the SCL 134) while also receiving (e.g., intercepting) this audio data 114 and sending the received audio data to the HEC 136 (sometimes via an additional SCL).

A local speech processing component 138 (sometimes referred to as a "speech processing component" 138, or a "spoken language understanding (SLU) component" 138) is configured to process audio data 114 (e.g., audio data 114 representing user speech, audio data 114 representing non-speech noise or sounds, etc.). In some embodiments, the hybrid request selector 130 may further include a local request orchestrator (LRO) 140 (or, local request orchestrator (LRO) subcomponent 140) of the hybrid request selector 130. The LRO 140 is configured to notify the local speech processing component 138, about the availability of new audio data 114 that represents user speech, and to otherwise initiate the operations of the local speech processing component 138 when new audio data 114 becomes available. In general, the hybrid request selector 130 may control the execution of the local speech processing component 138, such as by sending "execute" and "terminate" events/instructions to the local speech processing component 138. An "execute" event may instruct the local speech processing component 138 to continue any suspended execution based on audio data 114 (e.g., by instructing the local speech processing component 138 to execute on a previously-determined intent in order to generate a directive). Meanwhile, a "terminate" event may instruct the local speech processing component 138 to terminate further execution based on the audio data 114, such as when the speech interface device 102 receives directive data from the remote system 116 and chooses to use that remotely-generated directive data. The LRO 140 may also notify (or otherwise interact with) other local components, such as to notify those components about the availability of new audio data 114 and/or a new interaction that has started. For example, the LRO 140 may notify an interaction log manager (ILM) component 144 that an interaction between a user and the speech interface device 102 has started, and/or that new audio data 114 is otherwise available. The LRO 140 may send events to the ILM component 144 for this purpose, whenever an utterance is captured and new audio data 114 becomes available. The LRO 140 may also interact with a skills execution component 142 configured to receive intent data output from the local speech processing component 138 and to execute a skill based on the intent.

In the example of FIG. 1, where the user 104 utters the expression "Alexa, turn off the kitchen lights," the audio data 114 is received by the wakeword engine 122, which detects the wakeword "Alexa," and forwards the audio data 114 to the SIM 124 as a result. The SIM 124 may send the audio data 114 through the HP 132, and the HP 132 may allow the audio data 114 to pass through to the remote system 116 (e.g., via the SCL 134), and the HP 132 may also input the audio data 114 to the local speech processing component 138 by routing the audio data 114 through the HEC 136 of the hybrid request selector 130, whereby the LRO 140 notifies the local speech processing component 138 and/or the ILM component 144 of the incoming audio data 114. At this point, the hybrid request selector 130 may wait for response data from the remote system 116 and/or the local speech processing component 138.

The local speech processing component 138 is configured to receive the audio data 114 from the hybrid request selector 130 as input, to recognize speech and/or non-speech audio events in the audio data 114, to determine an intent (e.g., user intent) from the recognized speech or non-speech audio event. This intent can be provided to the skills execution component 142 via the LRO 140, and the skills execution component 142 can determine how to act on the intent by generating directive data. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the skills execution component 142 (and/or the remote speech processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the wide area network 118. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local speech processing component 138 may include an automatic speech recognition (ASR) component 146 (or, ASR subcomponent 146) that is configured to perform ASR processing on the audio data 114 to convert the audio data 114 into text data (sometimes referred to herein as "ASR text data," an "ASR result", or "ASR data"). ASR transcribes audio data 114 into text data representing the words of the user speech contained in the audio data 114. A spoken utterance in the audio data 114 can be input to the ASR component 146, which then interprets the utterance based on the similarity between the utterance and pre-established language models available to the local speech processing component 138. For example, the ASR component 146 may compare the input audio data 114 with models for sounds (e.g., subword units or phonemes) and sequences of sounds to identify words that match the sequence of sounds spoken in the utterance of the audio data 114. In some embodiments, the ASR component 146 outputs the most likely text recognized in the audio data 114, or multiple hypotheses in the form of a lattice or an N-best list with individual hypotheses corresponding to confidence scores or other scores (such as probability scores, etc.). In some embodiments, the ASR component 146 is customized to the user 104 (or multiple users) who created a user account to which the speech interface device 102 is registered. For instance, the language models (and other data) used by the ASR component 146 may be based on known information (e.g., preferences) of the user 104, and/or on a history of previous interactions with the user 104.

The local speech processing component 138 may also include a NLU component 148 (or, NLU subcomponent 148) that performs NLU processing on the generated ASR text data to determine intent data and/or slot data (referred to herein as a "NLU result", or "NLU data") so that directives may be determined (by the skills execution component 142) based on the intent data and/or the slot data. Generally, the NLU component 148 takes textual input (such as text data generated by the ASR component 146) and attempts to make a semantic interpretation of the ASR text data. That is, the NLU component 148 determines the meaning behind the ASR text data based on the individual words, and then the NLU component 148 can implement that meaning. The NLU component 148 interprets a text string to derive an intent or a desired action or operation from the user 104. This may include deriving pertinent pieces of information in the text that allow the NLU component 148 to identify a second device in the environment, if the user, for example, intends to control a second device (e.g., a light(s) in the user's 104 house, as is the case in the example of FIG. 1). The local speech processing component 148 may also provide a dialog management function to engage in speech dialogue with the user 104 to determine (e.g., clarify) user intents by asking the user 104 for information using speech prompts. In some embodiments, the NLU component 148 is customized to the user 104 (or multiple users) who created a user account to which the speech interface device 102 is registered. For instance, data used by the NLU component 148 to understand the meaning of ASR text may be based on known information (e.g., preferences) of the user 104, and/or on a history of previous interactions with the user 104.

In some embodiments, one or more subcomponents of the local speech processing component 138 may utilize "artifacts." An "artifact," as used herein, means compiled data that is executable by one or more subcomponents of the local speech processing component 138 when responding to user speech. Examples of artifacts include, without limitation, ASR models (e.g., acoustic models, language models, etc.), NLU models (e.g., grammar models), entity resolution (ER)

data (e.g., lexical data, including association data that associates names of entities with canonical identifiers of those entities, etc.), and/or TTS voice files. In some embodiments, the compiled form of an artifact includes a finite state transducer (FST) that is usable, by one or more subcomponents of the local speech processing component 138, to process user speech. A FST may include a compressed graph structure that relates to words and/or phrases (e.g., names of entities, expressions of intent, etc.).

In some embodiments, the local speech processing component 138 may also include, or be configured to use, one or more installed speechlets. Speechlets may represent domains that are used by the skills execution component 142 in order to determine how to act on an utterance in a particular way, such as by outputting a directive that corresponds to the determined intent, and which can be processed to implement the desired operation. Accordingly, the term "speechlet" may be used interchangeably herein with the term "domain" or "domain implementation." The speechlets installed on the speech interface device 102 may include, without limitation, a music speechlet (or music domain) to act an utterances with intents to play music on a device, such as via a speaker(s) of the speech interface device 102, a navigation speechlet (or a navigation domain) to act on utterances with intents to get directions to a point of interest with a known address, a shopping speechlet (or shopping domain) to act on utterances with intents to buy an item from an electronic marketplace, and/or a device control speechlet (or device control domain) to act on utterances with intents to control a second device(s) in the environment.

In order to generate a particular interpreted response, the NLU component 148 may apply grammar models and lexical information associated with the respective domains or speechlets to recognize one or more entities in the text of the query. In this manner the NLU component 148 may identify "slots" (i.e., particular words in query text) that may be needed for later command processing. Depending on the complexity of the NLU component 148, it may also label each slot with a type of varying levels of specificity (such as noun, place, city, artist name, song name, device name, or the like). Each grammar model used by the NLU component 148 may include the names of entities (i.e., nouns) commonly found in speech about the particular domain (e.g., generic terms), whereas the lexical information (e.g., from a gazetteer) is personalized to the user(s) and/or the device. For instance, a grammar model associated with the navigation domain may include a database of words commonly used when people discuss navigation.

Accordingly, the intents identified by the NLU component 148 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the NLU component 148 may parse the query to identify words as subject, object, verb, preposition, etc., based on grammar rules and/or models, prior to recognizing named entities. The identified verb may be used by the NLU component 148 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 148 may then search the corresponding fields in the domain-specific and personalized lexicon(s), attempting to match words and phrases in the query tagged as a grammatical object or object modifier with those identified in the database(s). This intent can be provided to the skills execution component 142 via the LRO 140, and the skills execution component 142 can determine how to act on the intent by generating directive data.

The local speech processing component 138 may also include an audio event processor (AEP) component 150 (or, AEP subcomponent 150) that may use models in a similar fashion to those described herein with respect to the models used by the ASR component 146 and the NLU component 148, but, instead of using models that map sequences of sounds to words of a spoken language, the models used by the AEP component 150 may map sequences of sounds to audio events used for audio event detection. In an example, the AEP component 150 may analyze the audio data 114 using machine learning models to determine a recognition result. This recognition result may confirm that the audio event detected by the AED 123 is in fact a recognized audio event, or may determine that the AED 123 falsely detected an audio event. The AEP component 150 may be further configured to determine an audio event intent, much like the NLU component 148 determines an intent based on ASR data representing user speech. In an example, the audio data 114 may represent a non-speech noise or sound(s) in the environment of the speech interface device 102, such as the sound of a hand clap, and the AEP component 150 may output AEP data that includes an audio event intent (intent data) to turn on/off the kitchen lights based on the detected audio event of a hand clap. This intent can be provided to the skills execution component 142 via the LRO 140, and the skills execution component 142 can determine how to act on the intent by generating directive data. This may involve using an audio event skill that is catered to non-speech audio events detected in the audio data 114.

When audio data 114 is processed locally on the speech interface device 102, the LRO 140 can notify the local speech processing component 138 that an "interaction" has started, and the audio data 114 can be input to the local speech processing component 138 where either ASR and NLU processing ensues or audio event processing (by the AEP component 150) ensues for recognizing either user speech or a non-speech audio event, respectively. After determining local intent data, or failing to do so, the local speech processing component 138 may send response data to the hybrid request selector 130, such as a "ReadyToExecute" response, which can indicate that the local speech processing component 138 has recognized an intent, or that the local speech processing component 138 is ready to communicate failure (if the local speech processing component 138 could not recognize an intent via the NLU component 148 and/or via the AEP component 150). The hybrid request selector 130 may then determine whether to use directive data from the local speech processing component 138 to respond to the audio data 114, or whether to use directive data received from the remote system 116, assuming a remote response is even received (e.g., when the speech interface device 102 is able to access the remote speech processing system 120 over the wide area network 118). In a scenario where the hybrid request selector 130 chooses remote directive data to respond to audio data 114, the microphone(s) 108 may be closed so that no more audio data is processed through the local speech processing component 138, and the local speech processing component 138 finishes processing whatever audio data it has already ingested.

In general, the LRO 140 is a central point that accepts inputs from various local components of the speech interface device 102, produces or otherwise handles outputs, and handles events. The LRO 140 may also move data along workflows to produce an end result. The ILM component 144 may receive events from the LRO 140 which notify the ILM component 144 about particular occurrences. For instance, the LRO 140 may send an event to the ILM component 144 indicating that a new interaction has started (e.g., an interaction between the user 104 and the speech interface device 102, an "interaction" based on a non-speech noise or sound(s) in the environment, etc.). The LRO 140 may follow this with an event to the ILM component 144 indicating that a set of processing operations (e.g., NLU processing operations, audio event processing operations, etc.) performed by the local speech processing component 138 have stopped (e.g., completed).

In this manner, data that is generated during a given session (e.g., interaction) can be stored on-device, and maintained in an interaction log. The data in the interaction log can be subsequently uploaded to the remote system 116 (via an ingestion system 154 of the remote system 116) when a connection is available. Because the data in the interaction log is considered critically sensitive customer private data, it is encrypted on-device (e.g., using asymmetric encryption) as encrypted data 156. On-device (or on-disk) storage of encrypted data 156 means storage of the encrypted data 156 in non-volatile memory (NVM) 157 of the speech interface device 102, which is sometimes referred to as "persistent storage". For example, the encryption of audio data 114, as well as metadata related to the output (or outcomes) of processing the audio data 114, can include storing or writing ciphertext to the filesystem of the speech interface device 102. An encryption operation can include converting non-ciphertext data (e.g., raw audio data represented by a sequence of bytes, text data, image data, etc.) into ciphertext data using a local processor(s), such as a processor(s) of the speech interface device 102. In the context of the present disclosure, an encryption operation can include converting raw audio data 114 represented by a sequence of bytes into ciphertext data. Once encrypted, the encrypted data 156 (e.g., ciphertext data, and possibly additional metadata) can be decrypted only after the encrypted data 156 reaches the trusted remote system 116, which has access to the proper keys used for decryption.

The encrypted data 156 of the interaction log may include, without limitation, audio data 114—such as audio data that represents user speech, and/or audio data that represents a sound or noise in the environment other than user speech, metadata related to the output (or outcome) of processing the audio data 114, and possibly other data. The aforementioned metadata may include, without limitation, ASR text data, NLU data (e.g., intent data, slot data, label data, etc.), audio event processing (AEP) data, timestamps, etc. There may be various reasons for storing this encrypted data 156 on the device and uploading the encrypted data 156 to the remote system 116. For example, the encrypted data 156, after being decrypted at the remote system 116, may be used for debugging purposes to improve local or offline speech recognition and/or audio event detection, and/or the decrypted data may be maintained as a record of past utterances made by the user 104 (e.g., an interaction log detailing what the user 104 said when interacting with the speech interface device 102 using his/her voice).

As mentioned, the encryption of audio data 114, in particular, is a computationally-intensive operation (e.g., a processing operation that, on average, utilizes or consumes a percentage of total computing resources (e.g., processing and/or memory resources) that exceeds a predetermined threshold percentage), and the techniques and systems described herein relate to deferment of audio data encryption so that local resources are freed up for use by other local components that are tasked with performing time-sensitive operations, such as speech processing and/or audio event detection. In the illustrative example of FIG. 1, the user 104 utters (e.g., "Alexa, turn off the kitchen lights"), which can be captured by a microphone(s) 108 of the speech interface device 102 and digitized into audio data 114. The audio data 114 can be sent over the network 118 to the remote speech processing system 120, and, in parallel, the audio data 114 can be input to the local speech processing component 138, as described herein. The LRO 140, in addition to notifying the local speech processing component 138 of the new audio data 114, can also notify the ILM component 144 (via an event, such as an "interactionStarted" event) that an interaction between a user 104 and the speech interface device 102 has started. It is to be appreciated that these operations (e.g., sending audio data 114 over the network 118, inputting the audio data 114 to the local speech processing component 138, and notifying the ILM component 114) can occur in parallel via the execution of multiple threads, or they may be executed sequentially in any order.

The ILM component 144, having been notified of the new interaction, may buffer the audio data 114 by storing the audio data 114 as buffered audio data 158 in volatile memory, such as a volatile memory buffer 159 (e.g., a dynamic random-access memory (DRAM) buffer), of the speech interface device 102. Such a volatile memory buffer can include any suitable form of volatile memory (e.g., volatile RAM) that is not used for persistent storage of data, but is used to temporarily store data until it is used, transmitted, deleted, and/or stored persistently. The buffered audio data 158 is maintained in local memory in unencrypted form because the computationally-intensive encryption operation is deferred, either partially or entirely, until a later time when the encryption will not negatively impact other time-sensitive operations that are to be performed by the local speech processing component 138. During local speech processing, the audio data 114 representing user speech may be partitioned into audio data samples that are sequentially processed through the ASR component 146. Each sample may be a particular number of bytes, representing a few milliseconds of audio, such as 5 milliseconds (ms), 10 ms, 15 ms, or any other suitable apportionment of the audio data 114. Thus, ASR processing of the audio data 114 may occur in a loop where the ASR component 146 receives multiple audio data samples and generates multiple recognition results. For instance, the ASR component 146 may process a first audio data sample and may generate first text data, which is followed by a second audio data sample, and possibly a third audio data sample, and so on, depending on the length of the utterance. It is to be appreciated that the ASR component 146 may send the audio data 114 (e.g., the audio data samples) it receives to the ILM component 144 so that the ILM component 144 can buffer the audio data 114 received from the ASR component 146. Alternatively, the ILM component 144 may receive the audio data 114 from another component, such as the LRO 140, or from a thread, such as a streaming thread, which may stream audio data 114 to both the ASR component 146 and the ILM component 144. In any case, the ILM component 144 receives audio data 114 (e.g., audio data samples) and, before encrypting the audio data, the ILM component 144 buffers the audio data 114 as buffered audio data 158 in the memory of the speech interface device 102.

As ASR processing generates recognition results, the ASR component 146 may send these recognition results (e.g., ASR text data or ASR transcriptions) to the ILM component 144. Because this ASR data includes text data, the ASR data is not particularly taxing on the processing resources of the speech interface device 102 to encrypt, and therefore, the ASR data the ILM component 144 receives from the ASR component 146 can be encrypted "on-the-fly" during the performance of speech processing operations by the local speech processing component 138. Notwithstanding this, however, the ILM component 144 may, in some embodiments, defer encryption of ASR data, such as by buffering the ASR data until a later point in time when speech processing has stopped. In the running example, the ASR data ("Alexa, turn off the kitchen lights") is generated and sent to the ILM component 144, whereby the ILM component 144 may encrypt the ASR data as the encrypted data 156, and the ILM component 144 may store the encrypted data 156 in memory of the speech interface device 102 so that it may be uploaded to the ingestion system 154 when a connection is available. The ASR data generated by the ASR component 146 is also provided to the NLU component 148 as input.

NLU processing of the ASR data may also occur in a loop where the NLU component 148 receives multiple recognition results (ASR text data) from the ASR component 146 and generates one or more interpretations or NLU results. As NLU processing generates NLU results, the NLU component 148 may send these NLU results (e.g., NLU data or interpretations) to the ILM component 144. Because this NLU data, like the ASR data, includes text data, the NLU data is not particularly taxing on the processing resources of the speech interface device 102 to encrypt, and therefore, the NLU data the ILM component 144 receives from the NLU component 148 can be encrypted "on-the-fly" during the performance of speech processing operations by the local speech processing component 138. Notwithstanding this, however, the ILM component 144 may, in some embodiments, defer encryption of NLU data, such as by buffering the NLU data until a later point in time when speech processing has stopped. In the running example, the NLU data (e.g., TurnOffApplianceIntent (ID: 1234, ID: 1235, etc.—which map to the kitchen lights) is generated and sent to the ILM component 144, whereby the ILM component 144 may encrypt the NLU data as the encrypted data 156, and the ILM component 144 may store the encrypted data 156 in memory of the speech interface device 102 so that it may be uploaded to the ingestion system 154 when a connection is available. The NLU data generated by the NLU component 148 is also sent to the skills execution component 142 for generating local directive data that, when processed locally, causes the speech interface device 102 to perform an action, such as sending command data via the communications interface 112 to the kitchen lights, causing them to turn off. In a non-speech example, the audio data 114 may be processed through the AEP component 150, which generates AEP data, which can be sent to the skills execution component for generating local directive data in a similar fashion.

At this point, processing operations performed by the local speech processing component 138 based on the audio data 114 have completed. The LRO 140 may notify the ILM component 144 of this completion of local speech processing operations by sending a second event to the ILM component 144. For example, the ILM component 144 may receive, from the LRO 140, the event: "interactionComplete (true: processed locally)", which indicates that the local speech processing operations have completed, and that the interaction (e.g., the interaction between a user 104 and the speech interface device 102) can be considered to be completed as well. The above-described event is merely an example event that can trigger the ILM component 144 to start encrypting the audio data 114 that was buffered in memory as the buffered audio data 158 (and possibly other metadata, if the metadata was also buffered for purposes of deferring metadata encryption). Other events may trigger the ILM component 144 to start encrypting the buffered audio data 158, such as the ILM component 144 receiving the NLU data from the NLU component 148, or the ILM component 144 receiving the AEP data from the AEP component 150.

It is to be appreciated that other events may trigger the ILM component 144 to start encrypting the buffered audio data 158, such as the ILM component 144 receiving an event from the LRO 140 that an interaction was abandoned. This may occur when a determination of a false detection of a wakeword and/or a false detection of an audio event is made. For example, the wakeword engine may believe that it heard a wakeword, and, during a downstream wakeword verification/confirmation operation, it may be determined that the wakeword was not uttered. Perhaps a word that sounds similar to the wakeword was uttered, resulting in the generation of audio data 114 and a subsequent abandonment of local speech processing. Similarly, the AED 123 may believe that it heard an audio event, and, during a downstream audio event verification/confirmation operation, it may be determined that the noise or sound(s) corresponding to the audio event were in fact not made. As another example, the NLU component 148 may have failed to recognize an intent based on the ASR text data that was generated from the audio data 114 and/or the AEP component 150 may have failed to recognize an intent based on an analysis of the audio data 114. In this case, further processing operations that are to be performed by the local speech processing component 138 may be abandoned or terminated, and the LRO 140 may provide an indication of this abandonment/termination via an event to the ILM component 144. As yet another example, response data may be received from the remote system 116 before local speech processing completes, such as before the NLU component 148 and/or the AEP component 150 has recognized an intent. In this scenario, the hybrid request selector 130 may select the remote response data for responding to the audio data 114, close the microphone 108, and ignore the local result, in which case, the LRO 140 may indicate to the ILM component 144 (e.g., via an event) that local result is being ignored, and the ILM component 144 can begin encrypting the buffered audio data 158. In this example, the LRO 140 may wait to provide this indication to the ILM component 144 until after the remote response data has been processed, so that encryption does not interfere with the local processing of the remote response data. In the aforementioned scenarios, where local speech processing is effectively ignored or abandoned, the buffered audio data 158 may, in some embodiments, be discarded or otherwise deleted from memory. Choosing to do this would conserve local resources of the speech interface device by avoiding unnecessary encryption and storage of such data on the speech interface device. However, it is to be appreciated that, in some embodiments, the buffered audio data 158 is encrypted as the encrypted data 156 and stored on-device even in these scenarios where local speech processing is ignored or abandoned (e.g., a false wake, a failure to recognize an intent, choosing to use earlier-received remote response data, etc.). Thus, these events can also trigger the ILM component 144 to encrypt and store the buffered audio data 158.

The encryption of the buffered audio data 158, when it is performed, may occur in samples of audio data, such as by encrypting one audio data sample after another. This generates the encrypted data 156 (e.g., ciphertext), which is stored in memory of the speech interface device 102 (e.g., in the filesystem of the speech interface device). This encrypted data 156 can be sent to the remote system 116 when a connection is available.

As will be described in more detail below, if encryption of the buffered audio data 158 has started, and a new interaction between the user 104 and the speech interface device 102 starts during the encryption of the buffered audio data 158, the encryption operation may be paused in the middle of encrypting the buffered audio data 158. This may be facilitated by partitioning the audio data 114 into small enough samples (e.g., no greater than about 2 kilobytes (KB) per audio data sample) so that the ILM component 144 can finish encrypting a current audio data sample relatively quickly so that encryption can be paused while the local speech processing component 138 processes speech locally. The audio samples that are streamed to the ASR component 146 and/or the AEP component 150 may be partitioned in this manner, or the ILM component 144 may be configured to further partition the audio data 114 into smaller samples, either before buffering the audio data 114, or after retrieving the buffered audio data 158 and before encrypting the buffered audio data 158. In some embodiments, the ILM component 144 may execute a separate process for encrypting audio data—e.g., a different process than a process used for local speech processing operations, which allows for suspending that process to pause the encryption whenever a new interaction between the user 104 and the speech interface device 102 starts.

The size of the volatile memory buffer 159 that maintains the buffered audio data 158 in memory may not be artificially limited other than by the amount of available memory on the speech interface device 102. Because it is likely that the encryption of the buffered audio data 158 will be deferred, either partially or entirely, for, at most, a few seconds, the speech interface device 102 is likely to possess a sufficient amount of memory to maintain the buffered audio data 158 during such a timeframe. In some embodiments, the amount of available memory for the volatile memory buffer 159 may be sufficient to buffer at least 50 seconds of audio data, and oftentimes more than 50 seconds of audio data. It is also to be appreciated that the buffered audio data 158 may be buffered in a secure portion of memory on the speech interface device 102, such as a portion of memory that is protected from illicit access by a firewall, by encryption, or by other means of securely storing data.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
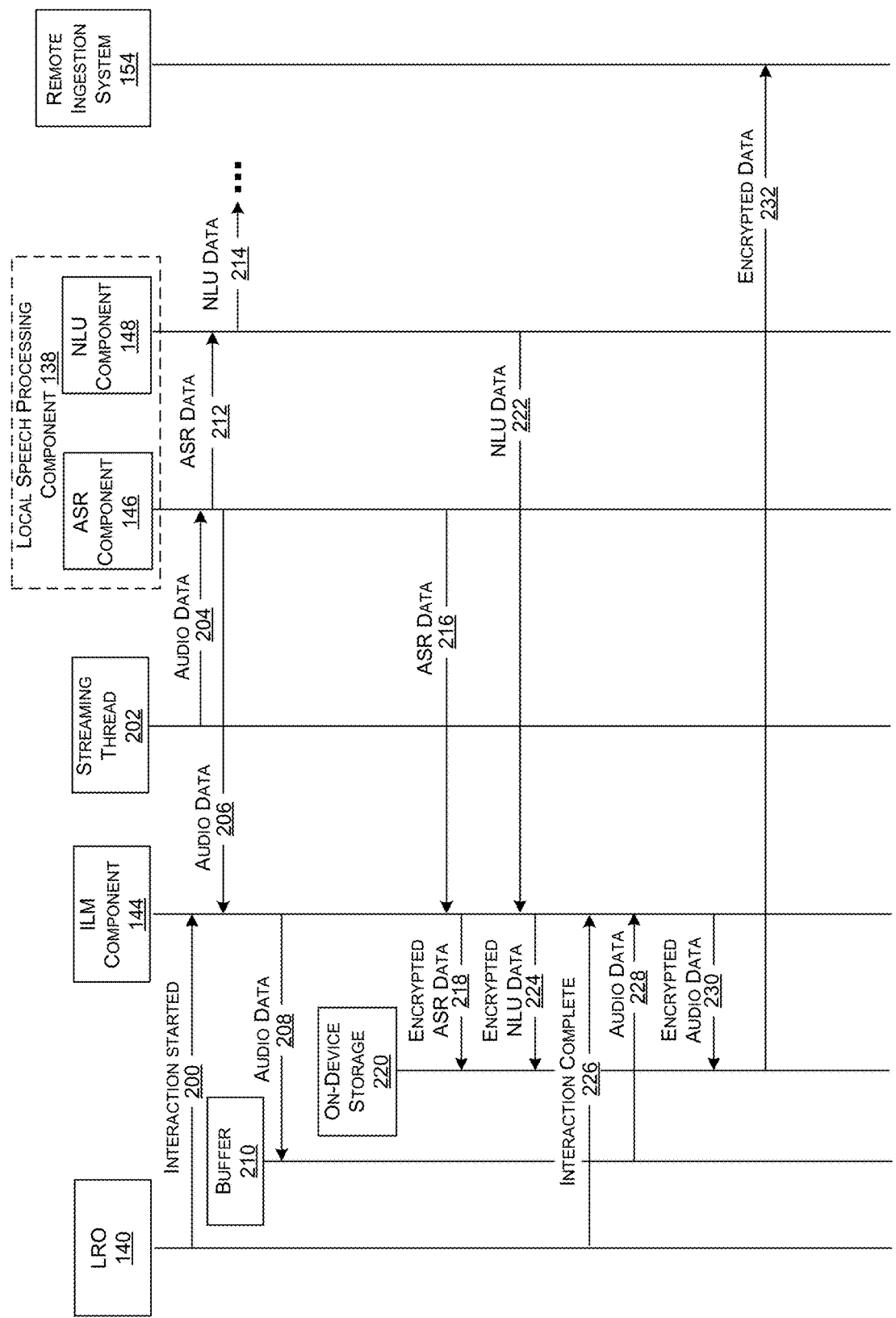
FIG. 2 is a diagram illustrating example signaling between executing components and threads of a speech interface device while processing user speech and encrypting audio data representing the user speech, FIG. 2 illustrating an example technique for deferring the encryption of the audio data until a time when the encryption operation is not competing with other computationally-intensive operations for responding to the user speech.

FIG. 2 is a diagram illustrating example signaling between executing components and threads of a speech interface device 102 while processing user speech and encrypting audio data representing the user speech. FIG. 2 illustrating an example technique for deferring the encryption of the audio data, either partially or entirely, until a time when the encryption operation is not competing with other computationally-intensive operations for responding to the user speech. Although the example of FIG. 2 describes one that is specific to speech processing, it is to be appreciated that a similar implementation may be used for deferring audio data encryption where the audio data represents a sound or a noise captured in the environment that is not user speech.

The signaling shown in FIG. 2 may start with the ILM component 144 receiving event data, such as a first event 200 (e.g., "interactionStarted" event 200) from the LRO 140. This first event 200 may indicate that an interaction between a user 104 and the speech interface device 102 has started. For example, the user 104 may have uttered "Alexa, turn off the kitchen lights" to start an interaction, causing the first event 200 to be sent by the LRO 140 to the ILM component 144. This tells the ILM component 144 to refrain from encrypting the forthcoming audio data 114.

A streaming thread 202 may be invoked to stream (or otherwise input) audio data 114 representing the user speech to the ASR component 146 at 204. In other words, the audio data 114 may be input to the local speech processing component 138 by running the audio data 114 through the ASR subcomponent 146. This may include sequentially inputting audio data samples to the ASR component 146. It is to be appreciated the streaming thread 202 is an example of a thread of execution. A "process" is an instance of a computer program. A process may be made up of multiple threads of execution that execute instructions concurrently. Accordingly, the streaming thread 202 may execute concurrently with another thread(s), and may be part of the same process as the other thread(s), or may be part of a different process from that of the other thread(s). The streaming thread 202 may execute concurrently with another thread(s) using a parallel multithreading implementation, or a processor(s) of the speech interface device 102 may execute each of multiple threads using time slicing, where the processor switches between executing the streaming thread 202 and another thread. Multiple threads may also share memory resources of the speech interface device 102. Threads can be used to divide (sometimes referred to as "split") a computer program into two or more executing tasks. In this sense, a thread can be contained inside of a process, and different threads in the same process may share the same resources.

At 206, the ASR component 146 may input (or send, stream, etc.) the audio data 114 to the ILM component 144. As noted elsewhere herein, the ILM component 144 may, alternatively, receive the audio data 114 from the LRO 140, or from the streaming thread 202.

At 208, the ILM component 144 may buffer the audio data 114 in a buffer 210 (e.g., the volatile memory buffer 159 of FIG. 1) of the speech interface device 102. "Buffering" the audio data 114, in this context, means storing the audio data in volatile memory of the speech interface device 102. Accordingly, the buffer 210 may represent volatile memory of the speech interface device 102 where audio data may be stored. Thus, the buffer 210 may be, or include, a volatile memory buffer (e.g., a DRAM buffer). The buffer 210 can include any suitable form of volatile memory (e.g., volatile RAM) that is not used for persistent storage of data, but is used to temporarily store data until it is used, transmitted, deleted, and/or stored persistently. The size of the volatile memory (e.g., the buffer 210) that maintains the buffered audio data may not be artificially limited other than by the amount of available memory on the speech interface device 102. Because it is likely that the encryption of the buffered audio data 158 will be deferred, either partially or entirely, for, at most, a few seconds, the volatile memory (e.g., the buffer 210) may be of a size that is suitable to maintain the buffered audio data 158 during such a timeframe. In some embodiments, the amount of available volatile memory on the speech interface device 102 may be sufficient to buffer at least 50 seconds of audio data, and oftentimes more than 50 seconds of audio data. It is also to be appreciated that the buffer 210 may be, or include, a secure portion of memory, such as a portion of memory that is protected from illicit access by a firewall, or the like.

Meanwhile, the ASR component 146 may perform ASR processing on the audio data 114 (e.g., audio data sample(s)) it receives from the streaming thread 202, and, at 212, the ASR component 146 may generate ASR data (e.g., text data). The ASR data (e.g., text data) is input to the NLU component 148, and the NLU component 148 performs NLU processing on the ASR data (e.g., text data) to generate NLU data at 214. In the example of FIG. 1, the ASR data input to the NLU component 148 may be the text data "Alexa, turn off the kitchen lights," which is NLU processed to generate the NLU data (e.g., TurnOffApplianceIntent (ID: 1234, ID: 1235, etc.—which map to the kitchen lights). As shown by the ellipses after 214, the NLU data can be sent downstream to further components that process the NLU data to generate local directive data, which, when processed, causes the speech interface device 102 to perform an action.

Furthermore, the ASR component 146, after generating the ASR data, may, at 216, send the ASR data to the ILM component 144 so that the ASR data can be encrypted and stored in the interaction log. In the example of FIG. 2, the ILM component 144 may encrypt the ASR data and, at 218, the ILM component 144 may store the encrypted ASR data in on-device storage 220, which may represent nonvolatile memory (e.g., the non-volatile memory 157 of FIG. 1) of the speech interface device 102 that persistently stores data, such as data stored in the file system of the device 102.

The NLU component 148, after generating the NLU data, may, at 222, send the NLU data to the ILM component 144 so that the NLU data can be encrypted and stored in the interaction log. In the example of FIG. 2, the ILM component 144 may encrypt the NLU data and, at 224, the ILM component 144 may store the encrypted NLU data in the on-device storage 220, as part of the interaction log that now contains the ASR data and the NLU data.

The NLU data with a recognized intent marks the completion of local speech processing, and the LRO 140 may respond by sending event data, such as a second event 226 (e.g., "interactionComplete" event 226) to the ILM component 144. Thus, the ILM component 144 receives the second event 226 indicating that processing operations performed by the local speech processing component 138 based on the audio data 114 have completed, and based on the receiving of this second event 226, the ILM component 144 may, at 228, retrieve the buffered audio data 158, and may encrypt the audio data to generate encrypted data 156. At 230, the encrypted (audio) data 156 can be stored in the on-device storage 220. In some embodiments, the second event 226 carries data, such as execution status data that indicates whether the interaction was executed online or offline, and possibly additional metadata about the interaction. This data carried in the second event 226 may also be encrypted and stored on-device. The example of FIG. 2 is one where the ASR data and the NLU data are encrypted on-the-fly, which may help make the later encryption and storage of the audio data 114 more efficient. Notwithstanding this, however, the ILM component 144 may, in some embodiments, defer encryption of ASR data and/or the NLU data, such as by buffering the ASR data and/or the NLU data until a later point in time when speech processing has stopped, such as after receiving the second event 226 (e.g., "interactionComplete" event 226).

At 232, after determining that a remote system 116 is available to the speech interface device 102, the encrypted data 156 (including the encrypted audio data) can be sent over a network 118 to the remote ingestion system 154 of the remote system 116.

It is to be appreciated that FIG. 2 illustrates an example scenario involving speech processing, and one that results in a recognized intent where local speech processing finishes to completion. However, other scenarios described herein are possible, such as a false wake detection, a failure of the NLU component 148 to recognize an intent, early receipt of remote response data, etc., which may also trigger encryption (or in some configurations, deletion) of the buffered audio data when local processing operations have otherwise stopped. Furthermore, as mentioned, encryption of audio data 114 representing non-speech audio events may be deferred similarly by the LRO 140 informing the ILM component 144 of start and stop times of operations performed by the local speech processing component 138 when invoking the AEP component 150 for audio event processing. That is, instead of streaming the audio data 114 to the ASR component 146 of the local speech processing component 138, the streaming thread 202 may, additionally or alternatively, stream the audio data 114, at 204, to the AEP component 150 of the local speech processing component 138, which may process the audio data 114 to confirm the detection of an audio event (e.g., a sound of glass breaking). In this case, AEP data (e.g., recognition result data corresponding to the recognized audio event) may be sent to the ILM component 144 for real-time encryption on-device, while the audio data 114 that includes the noise or sound(s) corresponding to the audio event may be buffered for encryption at a later time. Furthermore, although FIG. 2 illustrates an example where audio data encryption is deferred, in its entirety, until after the interaction complete event is received at 226, it is to be appreciated that, in some embodiments, partial deferment of audio data encryption may allow for some, but not all, of the encryption operations to be performed before the interaction complete event is received at 226, and the remaining encryption operations to be deferred until after the interaction complete event is received at 226. For instance, if some, but not all, of the encryption operations can be performed without causing the total processing resource consumption on the speech interface device 102 to exceed a threshold percentage, these encryption operations may not be deferred, while remaining encryption operations are deferred. In some embodiments, the ILM component 144 may determine an amount and/or types of encryption operations that can be performed without adding latency to ASR processing and/or NLU processing.

Figure 3:
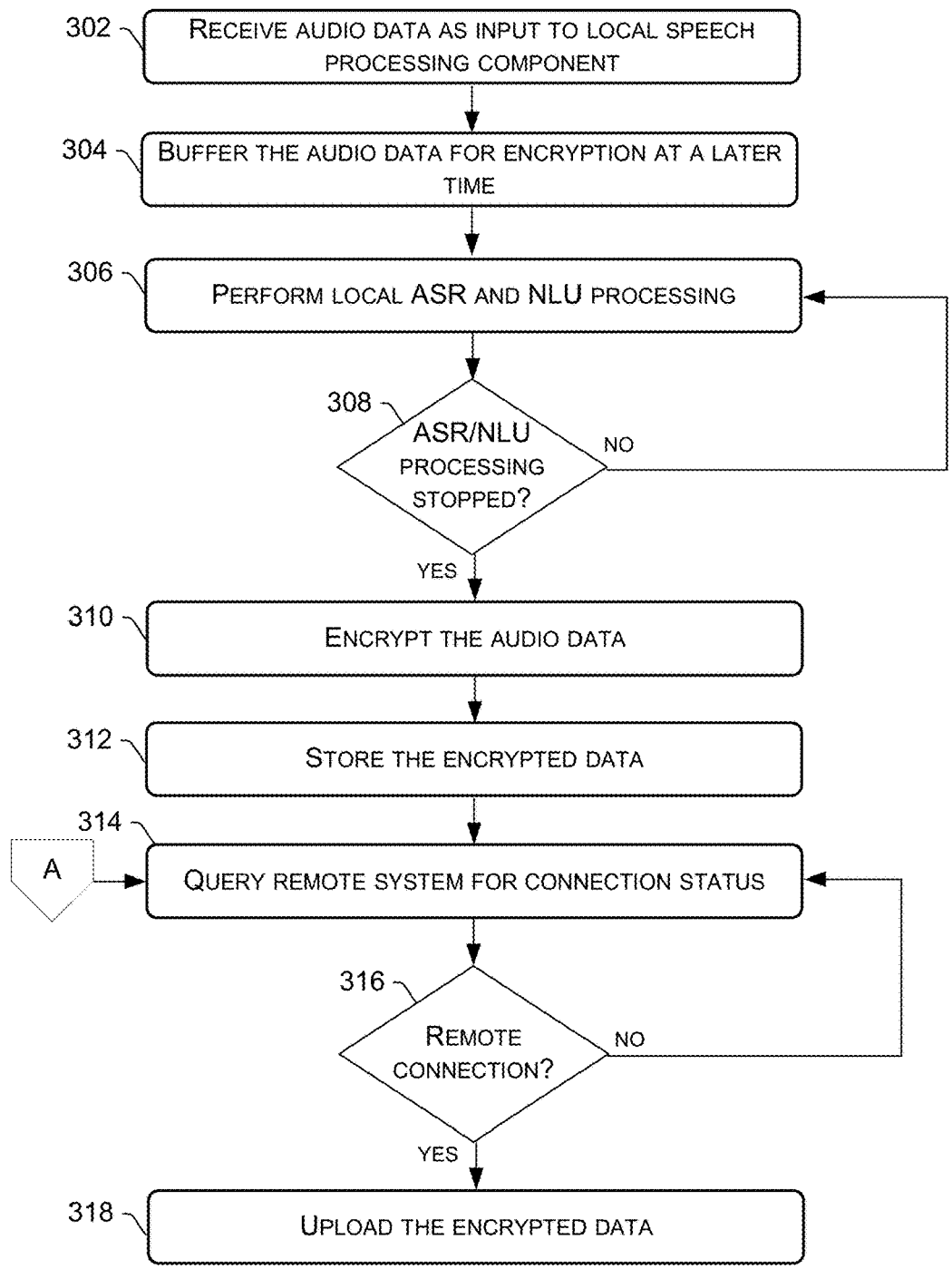
FIG. 3 is a flow diagram of an example process implemented by a speech interface device for deferring encryption of audio data representing user speech until a time when the encryption operation is not competing with other computationally-intensive operations for responding to the user speech.

FIG. 3 is a flow diagram of an example process 300 implemented by a speech interface device 102 for deferring encryption of audio data 114 representing user speech, either partially or entirely, until a time when the encryption operation is not competing with other computationally-intensive operations for responding to the user speech. For discussion purposes, the process 300 is described with reference to the previous figures.

At 302, audio data 114 representing user speech may be received as input to a local speech processing component 138 executing on the speech interface device 102. This may be accomplished by the subcomponents of the hybrid request selector 130. For example, a voice services component 126 of the speech interface device 102 may receive audio data 114 that represents user speech. This audio data 114 may be received via the SIM 124 component and sent through the HP 132 to the HEC 136, and ultimately sent to, and received by, the local speech processing component 138. The ILM component 144 may also receive event data (e.g., an interactionStarted event) indicative of the newly-received audio data 114. In the example of FIG. 1, the audio data 114 received at 302 may represent an utterance, such as "Alexa, turn off the kitchen lights." Furthermore, as described above, this audio data 114 can also be partitioned into multiple audio samples. As such, the audio data 114 may include one or more audio data samples, each corresponding to at least part the utterance. The number of audio data samples that are created may depend on the amount of audio data 114 generated (e.g., the number of samples may depend on the number of bytes of audio data).

At 304, the audio data 114 may be buffered, or stored in a volatile memory buffer 159 of the speech interface device 102, for encryption at a later time. This may be done the ILM component 144, such as upon the ILM component 144 receiving the audio data 114 from another local component (e.g., the ASR component 146), as described herein. After buffering the audio data 114 at block 304, the ILM component 144 may wait for additional event data (e.g., an interactionComplete event) indicating that it is safe to start encrypting the buffered audio data 158.

At 306, the local speech processing component 138 may perform operations to process the user speech locally. For example, the operations performed at block 306 can include ASR processing operations to generate text data (ASR data) based at least in part on the audio data 114, NLU processing operations to generate NLU data based at least in part on the text data (ASR data), etc. As another example, the local speech processing component 138 may input the audio data 114 to a deep neural network(s) that is configured to output NLU data that represents an interpretation of the user speech represented by the audio data 114.

At 308, logic of the speech interface device 102 (e.g., the LRO 140) may determine whether a set of processing operations performed by the local speech processing component 138 (e.g., the operations performed at block 306) based on the audio data 114 have stopped. If the set of processing operations performed by the local speech processing component 138 (e.g., the operations performed at block 306) based on the audio data 114 are still ongoing, the ILM component 144 is still waiting for the event data indicating that it is safe to start encrypting the audio data 114, and the process 300 may follow the "NO" route from block 308 back to block 306 where the operations of block 306 continue. At some point, such as, after the NLU component 148 generates NLU data corresponding to a recognized intent, the determination at block 308 is that the set of processing operations performed by the local speech processing component 138 (e.g., the operations performed at block 306) based on the audio data 114 have stopped, and the process 300 may follow the "YES" route from block 308 to block 310. It is to be appreciated that, following the "YES" route from block 308, the local speech processing component 138 may still be performing some operations that may consume less than some threshold amount of local computing resources. However, the computationally-intensive processing operations that, on average, exceed some threshold percentage of total resource consumption on the speech interface device 102 will have stopped following the "YES" route from block 308.

At 310, based on the determination at block 308 in the affirmative, the audio data 114 that was buffered at block 304 may be encrypted by the ILM component 144 to generate encrypted data 156. At 312, the encrypted data 156 may be stored by the ILM component 144 in the non-volatile memory 157 of the speech interface device 102 (e.g., ciphertext may be stored in the filesystem of the device 102).

At 314, logic of the speech interface device 102 (e.g., the ILM component 144) may query the remote system 116 by sending data to the remote system 116 (the system located at a geographically remote location) and waiting a period of time for response data from the remote system 116. At 316, the ILM component 144 may determine, based at least in part on whether response data from the remote system 116 was received prior to a lapse of the period of time, if a remote system 116 is available to the speech interface device 102. If a connection with the remote system 116 is unavailable at block 316 (e.g., the speech interface device 102 is offline), the process 300 may follow the "NO" route from block 316 back to block 314 to iterate the querying at block 314 (e.g., by periodically checking for a connection to the remote system 116). If, at 316, a connection with the remote system 116 is available, the process 300 may follow the "YES" route from block 316 to block 318 where the speech interface device 102 may send (e.g., upload) the encrypted data 156 over a network 118 to the remote system 116 (e.g., to the remote ingestion system 154).

Figure 4:
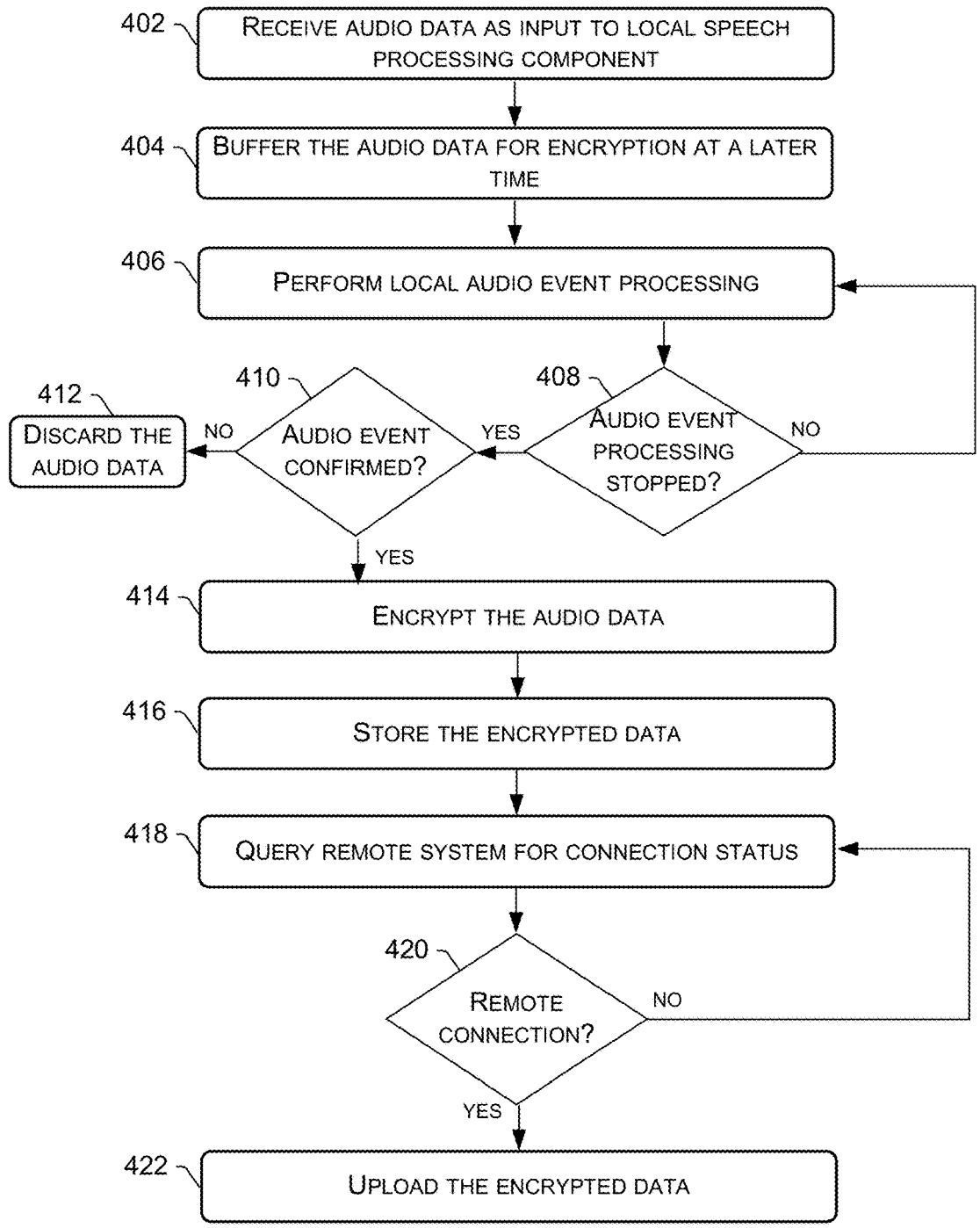
FIG. 4 is a flow diagram of an example process implemented by a speech interface device for deferring encryption of audio data analyzed for event detection until a time when the encryption operation is not competing with other computationally-intensive operations for responding to an event represented by the audio data.

FIG. 4 is a flow diagram of an example process 400 implemented by a speech interface device 102 for deferring encryption of audio data 114 analyzed for event detection, either partially or entirely, until a time when the encryption operation is not competing with other computationally-intensive operations for responding to an event represented by the audio data. For discussion purposes, the process 400 is described with reference to the previous figures.

At 402, audio data 114 representing a noise or a sound other than user speech that was captured in an environment of the speech interface device 102 may be received as input to a local speech processing component 138 executing on the speech interface device 102. The ILM component 144 may also receive event data (e.g., an interactionStarted event) indicative of the newly-received audio data 114.

At 404, the audio data 114 may be buffered, or stored in a volatile memory buffer 159 of the speech interface device 102 for encryption at a later time. This may be done the ILM component 144, such as upon the ILM component 144 receiving the audio data 114 from another local component (e.g., the AEP component 150), as described herein. After buffering the audio data 114 at block 404, the ILM component 144 may wait for additional event data (e.g., an interactionComplete event) indicating that it is safe to start encrypting the buffered audio data 158.

At 406, the local speech processing component 138 may perform operations to process the audio data 114 locally. For example, the operations performed at block 406 can include the AEP component 150 performing audio event processing operations to generate AEP data (e.g., recognition data of a recognized audio event, intent data corresponding to an audio event intent, etc.) based at least in part on the audio data 114.

At 408, logic of the speech interface device 102 (e.g., the LRO 140) may determine whether a set of processing operations performed by the local speech processing component 138 (e.g., the operations performed at block 406) based on the audio data 114 have stopped. If the set of processing operations performed by the local speech processing component 138 (e.g., the operations performed at block 406) based on the audio data 114 are still ongoing, the ILM component 144 is still waiting for the event data indicating that it is safe to start encrypting the audio data 114, and the process 400 may follow the "NO" route from block 408 back to block 406 where the operations of block 406 continue. At some point, such as, after the local speech processing component 138 generates AEP data corresponding to a recognized intent, the determination at block 408 is that the set of processing operations performed by the local speech processing component 138 (e.g., the audio event processing operations performed at block 406) based on the audio data 114 have stopped, and the process 400 may follow the "YES" route from block 408 to block 410. It is to be appreciated that, following the "YES" route from block 408, the local speech processing component 138 may still be performing some operations that may consume less than some threshold amount of local computing resources. However, the computationally-intensive processing operations that, on average, exceed some threshold percentage of total resource consumption on the speech interface device 102 will have stopped following the "YES" route from block 408.

At 410, based on the determination at block 408 in the affirmative, logic of the speech interface device 102 (e.g., the ILM component 144) may determine whether the AEP component 150 confirmed that the audio event detected by the AED 123 is in fact a recognized audio event. If, at 410, the ILM component 144 determines that the AED 123 falsely detected an audio event, meaning that the audio event was not confirmed by the AEP component 150 after further processing the audio data 114, the process 400 may follow the "NO" route from block 410 to block 412 where the ILM component 144 may discard the audio data 114 without encrypting or persistently storing the audio data 114. If, at block 410, the ILM component 144 determines that the detection of the audio event by the AED 123 was confirmed by the AEP component 150, the process 400 may follow the "YES" route from block 410 to block 414.

At 414, based on the determination at block 410 in the affirmative, the audio data 114 that was buffered at block 404 may be encrypted by the ILM component 144 to generate encrypted data 156. At 416, the encrypted data 156 may be stored by the ILM component 144 in the non-volatile memory 157 of the speech interface device 102 (e.g., ciphertext may be stored in the filesystem of the device 102).

At 418, logic of the speech interface device 102 (e.g., the ILM component 144) may query the remote system 116 by sending data to the remote system 116 (the system located at a geographically remote location) and waiting a period of time for response data from the remote system 116. At 420, the ILM component 144 may determine, based at least in part on whether response data from the remote system 116 was received prior to a lapse of the period of time, if a remote system 116 is available to the speech interface device 102. If a connection with the remote system 116 is unavailable at block 420 (e.g., the speech interface device 102 is offline), the process 400 may follow the "NO" route from block 420 to iterate the querying at block 418 (e.g., by periodically checking for a connection to the remote system 116). If, at 420, a connection with the remote system 116 is available, the process 400 may follow the "YES" route from block 420 to block 422 where the speech interface device 102 may send (e.g., upload) the encrypted data 156 over a network 118 to the remote system 116 (e.g., to the remote ingestion system 154).

Figure 5:
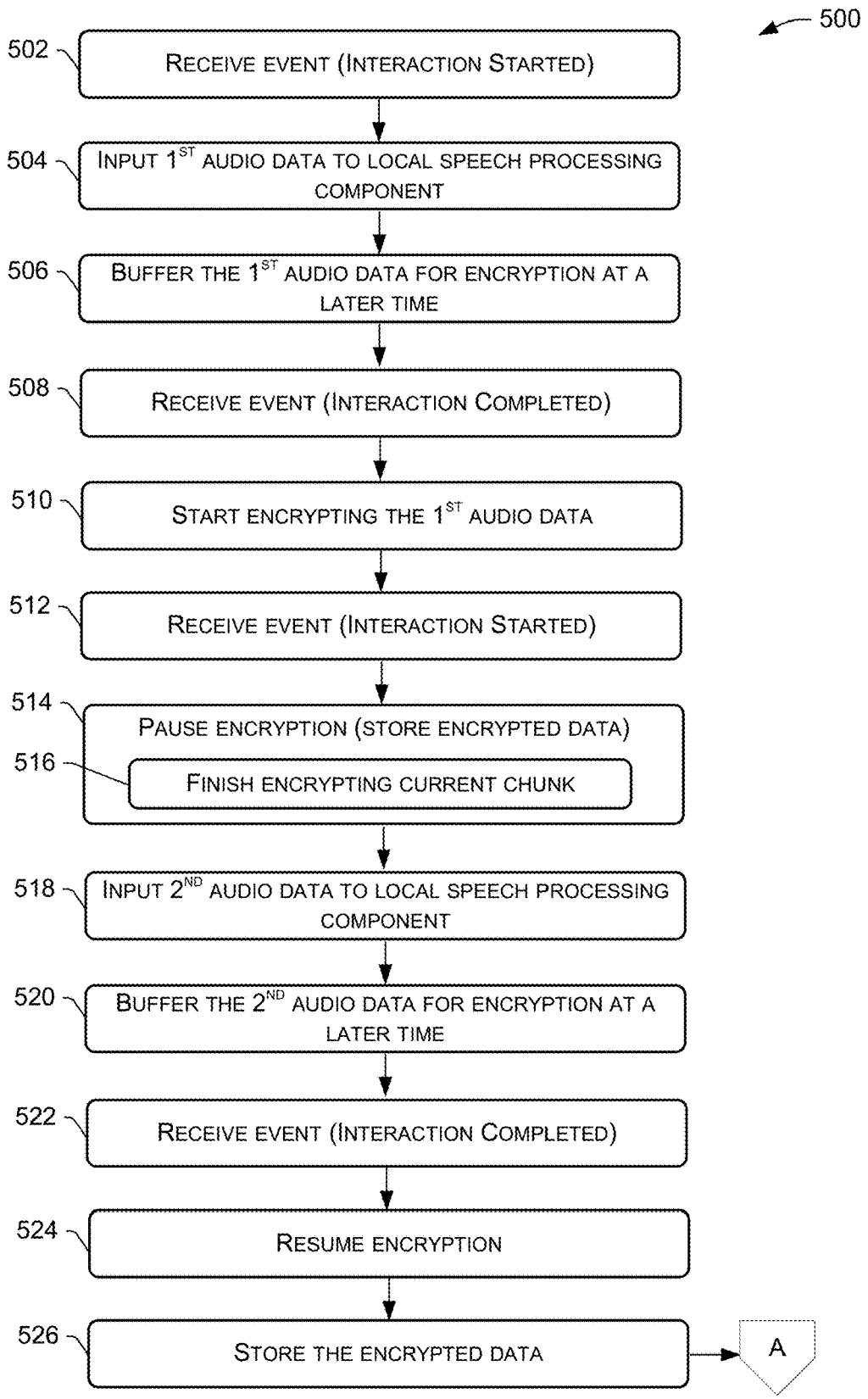
FIG. 5 is a flow diagram of an example process implemented by a speech interface device for pausing encryption of audio data to free up local resources for computationally-intensive speech processing tasks, and resuming encryption at a time when the encryption operation is not competing with these, and perhaps other, computationally-intensive operations on the device.

FIG. 5 is a flow diagram of an example process 500 implemented by a speech interface device 102 for pausing encryption of audio data 114 to free up local resources for computationally-intensive speech processing tasks, and resuming encryption at a time when the encryption operation is not competing with these, and perhaps other, computationally-intensive operations on the device 102. For discussion purposes, the process 500 is described with reference to the previous figures.

At 502, the ILM component 144 executing on the speech interface device 102 may receive first event data, such as a first event 200 (e.g., "interactionStarted" event 200) that indicates an interaction between a user 104 and the speech interface device 102 has started.

At 504, first audio data 114 representing user speech may be received as input to the local speech processing component 138 executing on the speech interface device 102, which performs ASR processing on the first audio data 114, and performs NLU processing on the ASR data generated from the first audio data 114, as described herein.

At 506, the first audio data 114 may be buffered, or stored in a volatile memory buffer 159 of the speech interface device 102, for encryption at a later time. This may be done the ILM component 144, such as upon the ILM component 144 receiving the first audio data 114 from another local component (e.g., the ASR component 146), as described herein.

At 508, the ILM component 144 may receive second event data, such as a second event 226 (e.g., "interactionComplete" event 226) that indicates a set of processing operations performed by the local speech processing component 138 based on the first audio data 114 have completed.

At 510, based on the receiving of the second event at block 508, the ILM component 144 may start encrypting the first audio data 114 that was buffered at block 506 to start generating encrypted data 156.

At 512, after starting the encrypting of the first audio data 114 at block 510, the ILM component 144 may receive third event data, such as a third event 200 (e.g., "interactionStarted" event 200) that indicates a second interaction between the user 104, or a different user, and the speech interface device 102 has started.

At 514, the ILM component 144 may pause the encrypting of the first audio data 114. As shown by sub-block 516, before the pausing at block 514, the ILM component 144 may finish the encrypting of a first portion (e.g., a current audio data sample) of the first audio data 114. This may be the case where the first audio data 114 is partitioned into small enough samples to facilitate quickly finishing encrypting of the current audio data sample so that encryption can be paused without having to wait a long time to pause the encryption. However, as noted elsewhere herein, the pausing at block 514 can occur immediately upon receipt of the third event at block 512 if, for example, a second process (computer program), different from a first process (computer program) used for speech processing, is used to perform the encrypting of the first audio data 114.

At 518, second audio data 114 representing second user speech may be received as input to the local speech processing component 138, which performs ASR processing on the second audio data 114, and performs NLU processing on the ASR data generated from the second audio data 114, as described herein.

At 520, the second audio data 114 may be buffered, or stored in a volatile memory buffer 159 of the speech interface device 102, for encryption at a later time. This may be done the ILM component 144, such as upon the ILM component 144 receiving the second audio data 114 from another local component, as described herein.

At 522, the ILM component 144 may receive fourth event data, such as a fourth event 226 (e.g., "interactionComplete" event 226) that indicates the set of processing operations performed by the local speech processing component 138 based on the second audio data 114 have completed for a second time.

At 524, based at least in part on the receiving of the fourth event at block 522, the ILM component 144 may resume the encrypting of the first audio data 114 where it left off. This may be accomplished using a queue of pending encryption tasks that keep the audio data samples in order such that the ILM component 144 starts encrypting the audio data sample at the front of the queue. In configurations where the ILM component 144 had finished encrypting the first portion (current sample) at sub-block 516 before pausing the encryption at block 514, resuming encryption at block 524 may start with a second (next) portion of the first audio data 114. Otherwise, the encryption may pick up from where it left off in the middle of encrypting the first audio data. Furthermore, the resuming encryption at block 524 includes, after completing the encrypting of the first audio data 114, encrypting the second audio data 114 to generate second encrypted data 156.

At 526, the encrypted data 156 may be stored in the non-volatile memory 157 of the speech interface device 102 (e.g., ciphertext may be stored in the filesystem of the device 102). This encrypted data 156 may be ciphertext corresponding to the first audio data 114 and the second audio data 114. As shown by the off-page reference "A" in FIGS. 3 and 5, the process 500 may continue from block 526 to block 314 of the process 300, where logic of the speech interface device 102 (e.g., the ILM component 144) may upload the encrypted data 156 when a connection is available.

Figure 6:
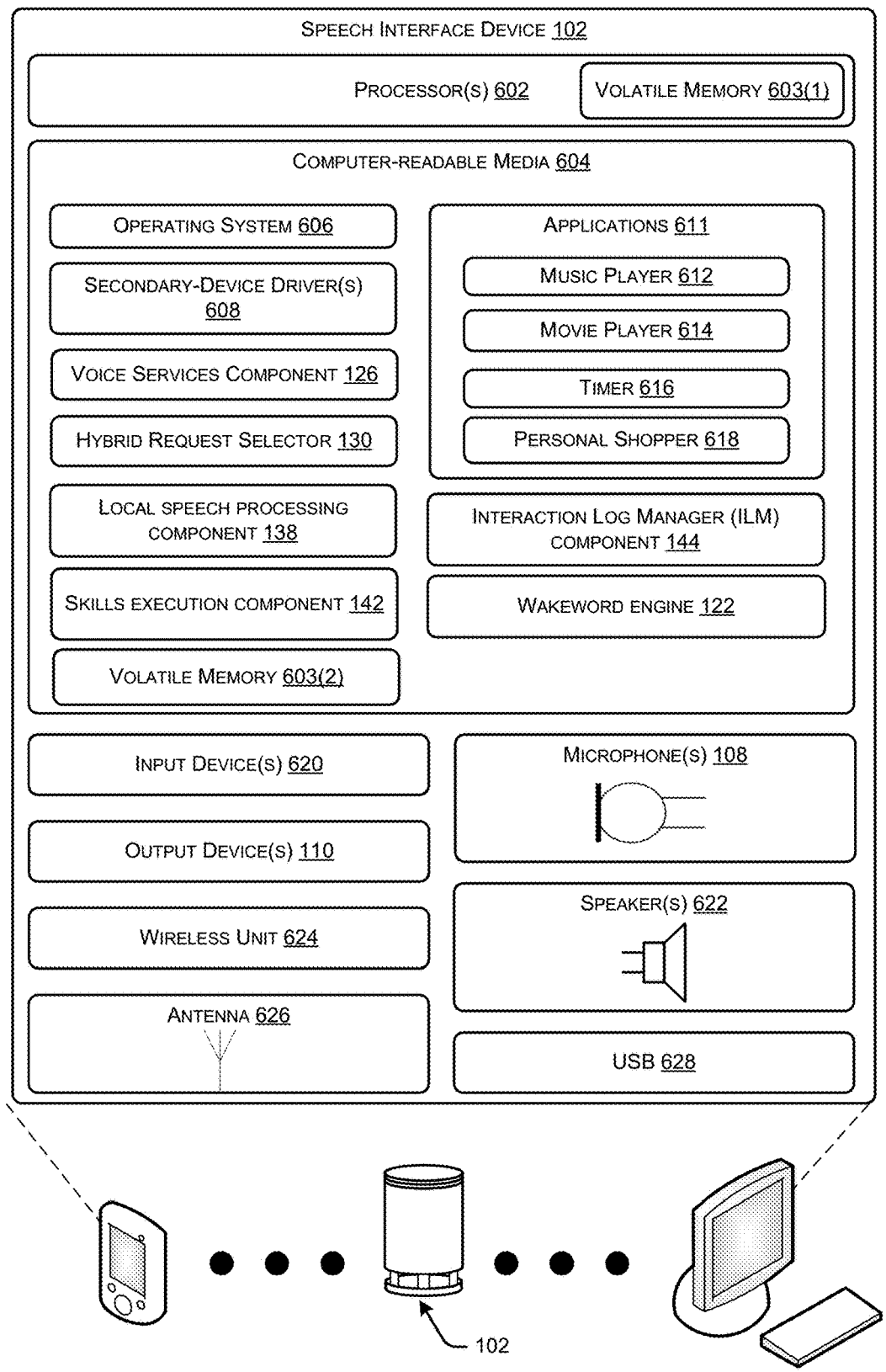
FIG. 6 illustrates example components of an electronic device, such as the speech interface device of FIG. 1.

FIG. 6 illustrates example components of an electronic device, such as the speech interface device 102 of FIG. 1. The speech interface device 102 may be implemented as a standalone device that is relatively simple in terms of functional capabilities with limited input/output components, memory, and processing capabilities. For instance, the speech interface device 102 may not have a keyboard, keypad, or other form of mechanical input. Nor does it have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 602 and computer-readable media 604 (often referred to herein as "memory" of the speech interface device 102, and/or "local memory" of the speech interface device 102). In some implementations, the processors(s) 602 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data and/or other data, and/or one or more operating systems. For example, the processor(s) 602 may include volatile memory 603(1), which may be used to store at least a portion of the audio data 114 before the audio data 114 is encrypted. As such, the volatile memory 603(1) may be, or include, a volatile memory buffer (e.g., a dynamic random-access memory (DRAM) buffer), of the speech interface device 102, such as the buffer 210, or at least a portion thereof. Such a volatile memory buffer can include any suitable form of volatile memory (e.g., volatile RAM) that is not used for persistent storage of data, but is used to temporarily store data until it is used, transmitted, deleted, and/or stored persistently. The size of the volatile memory 603(1) (e.g., the volatile memory buffer) that is configured to maintain the buffered audio data 158 may not be artificially limited. Because it is likely that the encryption of the buffered audio data 158 will be deferred, either partially or entirely, for, at most, a few seconds, the volatile memory 603(1) may be of a size that is suitable to maintain the buffered audio data 158 during such a timeframe. In some embodiments, the volatile memory 603(1), either alone or in combination with additional volatile memory 603(2), may be sufficient to buffer at least 50 seconds of audio data, and oftentimes more than 50 seconds of audio data. It is also to be appreciated that the volatile memory 603(1) may be a secure portion of memory on the speech interface device 102, such as a portion of memory that is protected from illicit access by a firewall, or the like.

The computer-readable media 604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 604 may be implemented as computer-readable storage media ("CRSM"), which may be any available physical media accessible by the processor(s) 602 to execute instructions stored on the memory 604. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

Several modules such as instruction, datastores, and so forth may be stored within the computer-readable media 604 and configured to execute on the processor(s) 602. A few example functional modules are shown as applications stored in the computer-readable media 604 and executed on the processor(s) 602, although the same functionality may alternatively be implemented in hardware, firmware, or as a system on a chip (SOC). At least some of the components and/or threads shown in FIGS. 1 and/or 2 may also be stored in the computer-readable media 604 and/or executable by the processor(s) 602 to implement the functionality described herein. For example, the voice services component 126, the hybrid request selector 130, the local speech processing component 138, the skills execution component 142, and the local ILM component 144, as well as their subcomponents, may be stored in the computer-readable media 604 and executable by the processor(s) 602 to implement the functionality described herein.

An operating system module 606 may be configured to manage hardware within and coupled to the speech interface device 102 for the benefit of other modules. In addition, the speech interface device 102 may include one or more secondary-device drivers 608 for sending control commands to second devices collocated in an environment with the speech interface device 102. The speech interface device 102 may further include the aforementioned wakeword engine 122.

The speech interface device 102 may also include a plurality of applications 611 stored in the computer-readable media 604 or otherwise accessible to the speech interface device 102. In this implementation, the applications 611 are a music player 612, a movie player 614, a timer 616, and a personal shopper 618. However, the speech interface device 102 may include any number or type of applications and is not limited to the specific examples shown here. The music player 612 may be configured to play songs or other audio files. The movie player 614 may be configured to play movies or other audio visual media. The timer 616 may be configured to provide the functions of a simple timing device and clock. The personal shopper 618 may be configured to assist a user in purchasing items from web-based merchants. When implementing the "hybrid" functionality described herein, where a remote system 116 is unavailable to the speech interface device 102, these applications 611 may be configured to access local resources (e.g., local music or movie libraries, a local shopping list, a local calendar, etc.). In some cases, changes made to these local resources may be synched with remote versions of those resources when the remote system 116 subsequently becomes available to the speech interface device 102.

The computer-readable media 604 may further include volatile memory 603(2). The volatile memory 603(2) may be used to store at least a portion of the audio data 114 before the audio data 114 is encrypted. As such, the volatile memory 603(2) may be, or include, a volatile memory buffer (e.g., a dynamic random-access memory (DRAM) buffer), of the speech interface device 102, such as the buffer 210, or at least a portion thereof. Such a volatile memory buffer can include any suitable form of volatile memory (e.g., volatile RAM) that is not used for persistent storage of data, but is used to temporarily store data until it is used, transmitted, deleted, and/or stored persistently. The size of the volatile memory 603(2) (e.g., the volatile memory buffer) that is configured to maintain the buffered audio data 158 may not be artificially limited other than by the amount of available memory on the speech interface device 102. Because it is likely that the encryption of the buffered audio data 158 will be deferred, either partially or entirely, for, at most, a few seconds, the volatile memory 603(1) may be of a size that is suitable to maintain the buffered audio data 158 during such a timeframe. In some embodiments, the volatile memory 603(2), either alone or in combination with additional volatile memory 603(1), may be sufficient to buffer at least 50 seconds of audio data, and oftentimes more than 50 seconds of audio data. It is also to be appreciated that the volatile memory 603(2) may be a secure portion of memory on the speech interface device 102, such as a portion of memory that is protected from illicit access by a firewall, or the like.

Generally, the speech interface device 102 has input devices 620 and output devices 110. The input devices 620 may include, without limitation, a keyboard, keypad, mouse, touch screen, joystick, control buttons, etc. In some implementations, one or more microphones 108, introduced in FIG. 1, may function as input devices 620 to receive audio input, such as user voice input. The output device(s) 110, introduced in FIG. 1, may include, without limitation, a display(s), a light element (e.g., LED), a vibrator to create haptic sensations, or the like. In some implementations, one or more speakers 622 may function as output devices 110 to output audio sounds (e.g., audio content, TTS responses, tones at various frequencies, etc.).

A user 104 may interact with the speech interface device 102 by speaking to it, and the one or more microphone(s) 108 captures the user's speech (utterances). The speech interface device 102 can communicate back to the user 104 by emitting audible statements through the speaker(s) 622. In this manner, the user 104 can interact with the speech interface device 102 solely through speech, without use of a keyboard or display.

The speech interface device 102 may further include a wireless unit 624 coupled to an antenna 626 to facilitate a wireless connection to a network. The wireless unit 624 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over the wide area network 118. As such, the speech interface device 102 may be configured to act as a hub that can communicate with second devices in the environment and control the second devices, such as by using protocol stacks, drivers, and adapters to communicate over a suitable communications protocol. A USB port(s) 628 may further be provided as part of the speech interface device 102 to facilitate a wired connection to a network, or a plug-in network device that communicates with other wireless networks. In addition to the USB port 628, or as an alternative thereto, other forms of wired connections may be employed, such as a broadband connection, Transmission Control Protocol/Internet Protocol (TCP/IP) protocol connection, etc. The communications interface 112 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 108. Further, there may be no output such as a display for text or graphical output. The speaker(s) 622 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Figure 7:
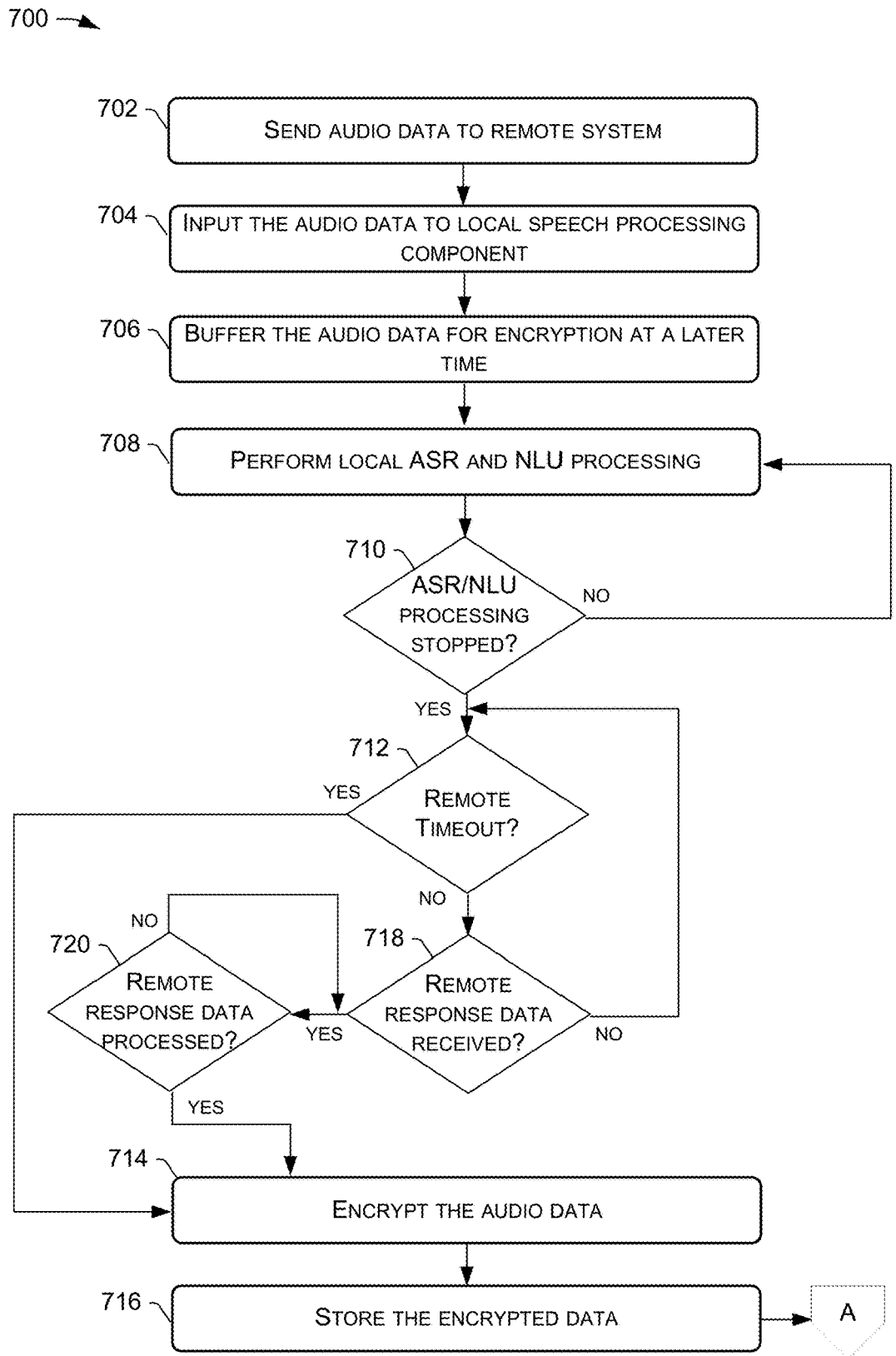
FIG. 7 is a flow diagram of an example process implemented by a speech interface device for deferring encryption of audio data representing user speech until a time when it is unlikely that remote response data will be received for processing on the speech interface device.

FIG. 7 is a flow diagram of an example process 700 implemented by a speech interface device 102 for deferring encryption of audio data 114 representing user speech until a time when it is unlikely that remote response data will be received for processing on the speech interface device 102. For discussion purposes, the process 700 is described with reference to the previous figures.

At 702, audio data 114 representing user speech may be sent, by the speech interface device 102, over a network 118 to a remote system 116 (e.g., a remote speech processing system 120). In this case, logic of the speech interface device 102 may be configured to wait a period of time for response data from the remote system 116.

At 704, audio data 114 representing user speech may be input to a local speech processing component 138 executing on the speech interface device 102.

At 706, the audio data 114 may be buffered in memory of the speech interface device 102 for encryption at a later time. This may be done the ILM component 144, such as upon receiving the audio data 114 from another local component, as described herein.

At 708, the local speech processing component 138 may perform operations to process the user speech locally. For example, the operations performed at block 708 can include ASR processing operations to generate text data (ASR data) based at least in part on the audio data 114, NLU processing operations to generate NLU data based at least in part on the text data (ASR data), etc.

At 710, logic of the speech interface device 102 may determine whether processing operations performed by the local speech processing component 138 (e.g., the operations performed at block 708) based on the audio data 114 have stopped. If the processing operations performed by the local speech processing component 138 (e.g., the operations performed at block 708) based on the audio data 114 are still ongoing, the process 700 may follow the "NO" route from block 710 back to block 708 where the operations of block 708 continue. At some point, such as, after the NLU component 148 generates NLU data corresponding to a recognized intent, the determination at block 710 is that the processing operations performed by the local speech processing component 138 (e.g., the operations performed at block 708) based on the audio data 114 have stopped, and the process 700 may follow the "YES" route from block 710 to block 712.

At 712, logic of the speech interface device 102 may determine whether a remote timeout has occurred (e.g., whether a lapse of the period of time has occurred without receiving the expected response data from the remote system 116). If the period of time has lapsed at block 712, the speech interface device 102 does not wait any longer for a remote response, and the process 700 may follow the "YES" route from block 712 to block 714.

At 714, based on the determination at block 712 in the affirmative, the audio data 114 that was buffered at block 706 may be encrypted to generate encrypted data 156. At 716, the encrypted data 156 may be stored in the memory of the speech interface device 102 (e.g., ciphertext may be stored in the filesystem of the device 102). As shown by the off-page reference "A" in FIGS. 3 and 7, the process 700 may continue from block 716 to block 314 of the process 300, where logic of the speech interface device 102 may upload the encrypted data 156 when a connection is available.

If, at block 712, the period of time has not yet lapsed, the process 700 may follow the "NO" route from block 712 to block 718, where logic of the speech interface device 102 may determine whether response data has been received from the remote system 116 prior to the lapse of the period of time. If remote response data has not been received at block 718, the process 700 may iterate blocks 712 and 718 by following the "NO" route from block 718. If, at block 718, logic of the speech interface device 102 determines that response data has been received from the remote system 116 prior to the lapse of the period of time, the process 700 may follow the "YES" route from block 718 to block 720.

At 720, logic of the speech interface device 102 may determine whether the remote response data has been processed at the speech interface device 102 (e.g., whether remote directive data has been processed to cause the speech interface device 102 to perform an action). If the remote response data has not been processed yet, the process 700 may follow the "NO" route from block 720 to iterate the determination at block 720 until it is determined that the remote response data has been processed at the speech interface device 102, in which case, the process 700 may follow the "YES" route from block 720 to block 714 where after the audio data 114 that was buffered at block 706 may be encrypted to generate encrypted data 156, and to block 716 where the encrypted data 156 may be stored in the memory of the speech interface device 102.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A speech interface device comprising:
   one or more processors;
   volatile memory;
   non-volatile memory; and non-transitory computer-readable memory storing computer-executable instructions that, when executed by the one or more processors, cause performance of operations comprising:
  receiving, by an interaction log manager (ILM) component executing on the speech interface device, first event data that indicates an interaction between a user and the speech interface device has started;
  receiving, by a speech processing component executing on the speech interface device, audio data that represents user speech;
  storing the audio data in the volatile memory;
  generating, by an automatic speech recognition (ASR) component executing on the speech interface device, text data representing the audio data;
  generating, by a natural language understanding (NLU) component executing on the speech interface device, NLU data representing the text data;
  receiving, by the ILM component, second event data that indicates processing operations performed by the speech processing component based on the audio data have completed; and
  based at least in part on the receiving of the second event data:
    encrypting the audio data to generate encrypted data; and
    storing the encrypted data in the non-volatile memory.

2. The speech interface device of claim 1, wherein the interaction is a first interaction, the audio data is first audio data, the user speech is first user speech, the text data is first text data, the NLU data is first NLU data, and the encrypted data is first encrypted data, the operations further comprising:
  after starting the encrypting of the first audio data, receiving, by the ILM component, third event data that indicates a second interaction between the user and the speech interface device has started;
  pausing the encrypting of the first audio data;
  inputting second audio data that represents second user speech to the speech processing component;
  storing the second audio data in the volatile memory;
  generating, by the ASR component, second text data representing the second audio data;
  generating, by the NLU component, second NLU data representing the second text data;
  receiving, by the ILM component, fourth event data that indicates second processing operations performed by the speech processing component based on the second audio data have completed;
  based at least in part on the receiving of the fourth event data, resuming the encrypting of the first audio data; and
  after completing the encrypting of the first audio data:
    encrypting the second audio data to generate second encrypted data; and
    storing the second encrypted data in the non-volatile memory.

3. The speech interface device of claim 2, the operations further comprising:
  after the receiving of the third event data and before the pausing, finishing the encrypting of a first portion of the first audio data,
  wherein the resuming of the encrypting of the first audio data starts with encrypting a second portion of the first audio data.

4. The speech interface device of claim 2, wherein a first computer program is used by the speech processing component to process the first audio data and to process the second audio data, and a second computer program, different from the first computer program, is used to perform the encrypting of the first audio data and to perform the encrypting of the second audio data.

5. The speech interface device of claim 1, the operations further comprising:
  sending the audio data to a speech processing system that is located at a geographically remote location,
  wherein the receiving of the second event data is based at least in part on at least one of:
    determining a false detection of a wakeword;
    determining that the NLU data indicates that the NLU component has failed to recognize an intent based on the text data; or
    receiving response data from the speech processing system before the NLU component has recognized the intent and determining to use the response data to respond to the user speech.

6. A method, comprising:
  receiving, as input to a speech processing component executing on a speech interface device, audio data that represents user speech;
  storing the audio data in volatile memory of the speech interface device;
  performing, by the speech processing component, a set of processing operations based on the audio data to respond to the user speech;
  receiving event data that indicates the set of processing operations performed by the speech processing component based on the audio data have stopped; and
  based at least in part on the receiving of the event data:
    encrypting the audio data to generate encrypted data; and
    storing the encrypted data in non-volatile memory of the speech interface device.

7. The method of claim 6, further comprising:
  sending the audio data to a speech processing system that is located at a geographically remote location,
  wherein the event data is received based at least in part on at least one of:
    determining a false detection of a wakeword;
    determining that a natural language understanding (NLU) component executing on the speech interface device has failed to recognize an intent based on text data that represents the audio data; or
    receiving response data from the speech processing system before the NLU component has recognized the intent and determining to use the response data to respond to the user speech.

8. The method of claim 6, wherein the audio data is first audio data, the user speech is first user speech, the event data is second event data, and the encrypted data is first encrypted data, the method further comprising:
  receiving, prior to the receiving of the first audio data as input to the speech processing component, first event data that indicates a first interaction between a user and the speech interface device has started;
  after starting the encrypting of the first audio data, receiving third event data that indicates a second interaction between the user, or a different user, and the speech interface device has started;
  pausing the encrypting of the first audio data;
  receiving second audio data representing second user speech as input to the speech processing component;

storing the second audio data in the volatile memory of the speech interface device;
receiving fourth event data that indicates the set of processing operations performed by the speech processing component based on the second audio data have stopped for a second time;
based at least in part on the receiving of the fourth event data, resuming the encrypting of the first audio data; and
after completing the encrypting of the first audio data:
 encrypting the second audio data to generate second encrypted data; and
 storing the second encrypted data in the non-volatile memory of the speech interface device.

9. The method of claim 8, further comprising:
after the receiving of the third event data and before the pausing, finishing the encrypting of a first portion of the first audio data,
wherein the resuming of the encrypting of the first audio data starts with encrypting a second portion of the first audio data.

10. The method of claim 8, further comprising:
performing the set of processing operations using a first computer program; and
performing the encrypting of the first audio data and the encrypting of the second audio data using a second computer program that is different from the first computer program.

11. The method of claim 6, further comprising:
sending data to a system that is located at a geographically remote location;
receiving response data from the system prior to a lapse of a period of time;
determining, based at least in part on the receiving of the response data from the system prior to the lapse of the period of time, that the system is available to the speech interface device; and
sending the encrypted data to the system.

12. The method of claim 6, further comprising:
generating, by an audio event processing (AEP) component executing on the speech interface device, AEP data based at least in part on the audio data.

13. The method of claim 6, further comprising:
sending the audio data to a speech processing system that is located at a geographically remote location,
wherein the event data is received based at least in part on at least one of:
 determining a false detection of an audio event;
 determining that an audio event processing (AEP) component executing on the speech interface device has failed to recognize an intent; or
 receiving response data from the speech processing system before the AEP component has recognized the intent and determining to use the response data to respond to the audio data.

14. A speech interface device comprising:
one or more processors;
volatile memory;
non-volatile memory; and
non-transitory computer-readable memory storing computer-executable instructions that, when executed by the one or more processors, cause performance of operations comprising:
 receiving, as input to a speech processing component executing on the speech interface device, audio data that represents user speech;
 storing the audio data in the volatile memory;
 performing, by the speech processing component, a set of processing operations based on the audio data to respond to the user speech;
 receiving event data that indicates the set of processing operations performed by the speech processing component based on the audio data have stopped; and
 based at least in part on the receiving of the event data:
  encrypting the audio data to generate encrypted data; and
  storing the encrypted data in the non-volatile memory of the speech interface device.

15. The speech interface device of claim 14, wherein the audio data is first audio data, the user speech is first user speech, the event data is second event data, and the encrypted data is first encrypted data, the operations further comprising:
receiving, prior to the receiving of the first audio data as input to the speech processing component, first event data that indicates a first interaction between a user and the speech interface device has started;
after starting the encrypting of the first audio data, receiving third event data that indicates a second interaction between the user, or a different user, and the speech interface device has started;
pausing the encrypting of the first audio data;
receiving second audio data representing second user speech as input to the speech processing component;
storing the second audio data in the volatile memory;
receiving fourth event data that indicates the set of processing operations performed by the speech processing component based on the second audio data have stopped for a second time;
based at least in part on the receiving of the fourth event data, resuming the encrypting of the first audio data; and
after completing the encrypting of the first audio data:
 encrypting the second audio data to generate second encrypted data; and
 storing the second encrypted data in the non-volatile memory.

16. The speech interface device of claim 15, the operations further comprising:
after the receiving of the third event data and before the pausing, finishing the encrypting of a first portion of the first audio data,
wherein the resuming of the encrypting of the first audio data starts with encrypting a second portion of the first audio data.

17. The speech interface device of claim 15, wherein a first computer program is used by the speech processing component to process the first audio data and to process the second audio data, and a second computer program, different from the first computer program, is used to perform the encrypting of the first audio data and to perform the encrypting of the second audio data.

18. The speech interface device of claim 14, the operations further comprising:
sending the audio data to a speech processing system that is located at a geographically remote location,
wherein the event data is received based at least in part on at least one of:
 determining a false detection of a wakeword;
 determining that a natural language understanding (NLU) component executing on the speech interface device has failed to recognize an intent based on text data that represents the audio data; or receiving response data from the speech processing system before the NLU component has recognized the intent and determining to use the response data to respond to the user speech.

19. The speech interface device of claim 14, the operations further comprising:
generating, by an audio event processing (AEP) component executing on the speech interface device, AEP data based at least in part on the audio data.

20. The speech interface device of claim 14, the operations further comprising:
sending data to a system that is located at a geographically remote location;
receiving response data from the system prior to a lapse of a period of time;
determining, based at least in part on the receiving of the response data from the system prior to the lapse of the period of time, that the system is available to the speech interface device; and
sending the encrypted data to the system.

* * * * *